(12) United States Patent
Deyaf et al.

(10) Patent No.: US 11,364,837 B1
(45) Date of Patent: Jun. 21, 2022

(54) MULTICOLOR DATA CONTROL

(71) Applicant: Feniex Industries, Austin, TX (US)

(72) Inventors: Hamza Deyaf, Austin, TX (US); Kyle Hale, Austin, TX (US); Nicholas Cameron Marth, Austin, TX (US); Aaron Brown, Austin, TX (US); Geoffrey Salazar, Cedar Park, TX (US)

(73) Assignee: Feniex Industries, Austin, TX (US)

( * ) Notice: Subject to any disclaimer, the term of this patent is extended or adjusted under 35 U.S.C. 154(b) by 0 days.

(21) Appl. No.: 17/471,598

(22) Filed: Sep. 10, 2021

(51) Int. Cl.
*B60Q 1/00* (2006.01)
*B60Q 1/46* (2006.01)
*H05B 45/10* (2020.01)
*H05B 45/20* (2020.01)
*H05B 47/115* (2020.01)
*H05B 47/125* (2020.01)
*H05B 47/165* (2020.01)
*H05B 47/18* (2020.01)
*G01V 3/08* (2006.01)

(52) U.S. Cl.
CPC ......... *B60Q 1/0088* (2013.01); *B60Q 1/0076* (2013.01); *B60Q 1/46* (2013.01); *H05B 45/10* (2020.01); *H05B 45/20* (2020.01); *H05B 47/115* (2020.01); *H05B 47/125* (2020.01); *H05B 47/165* (2020.01); *H05B 47/18* (2020.01); *B60Q 2400/20* (2013.01); *G01V 3/081* (2013.01)

(58) Field of Classification Search
CPC ...... B60Q 1/0076; H05B 45/10; H05B 45/20; H05B 47/115; H05B 47/125; H05B 47/165; H05B 47/18; G01V 3/081
See application file for complete search history.

(56) References Cited

U.S. PATENT DOCUMENTS

| 2017/0166108 A1* | 6/2017 | Warren ................. B60Q 1/076 |
| 2018/0054870 A1* | 2/2018 | Yanagizu ........... H05B 45/3725 |
| 2020/0307445 A1* | 10/2020 | Bader ...................... B60Q 1/46 |

* cited by examiner

*Primary Examiner* — Renan Luque

(57) ABSTRACT

Examples provide a vehicle multicolor light control system for managing light devices using serial data communication. A vehicle includes a plurality of multicolor light devices and a plurality of physical light control switches. A light controller device acts as an intermediary device between the light devices and the switch devices. The light controller device sends a data packet including instructions for controlling light activation, light deactivation, color combinations of the light, flash pattern of the light device and other functions of the light device in response to user activation or deactivation of one or more of the physical switch devices, a vehicle function activation, input from a user interface device or other data indicating a user-selected mode. The instructions in the data packet can control a single light device or multiple light devices within the same light device zone.

20 Claims, 23 Drawing Sheets

MULTICOLOR DATA CONTROL

BACKGROUND

Emergency vehicles typically include many different types of lights located on many different locations on the vehicles. For example, an emergency vehicle can include headlights, taillights, light bars on the roof of the car, license plate lights, side mirror lights, rear view mirror lights, lights on the bumpers, etc. Each light includes a bundle of wires running from the light to one or more physical switches in the passenger compartment. The switches are used to activate lights (on and off), dim the lights, turn on light flashing, and other functions in each mode. A separate wire is required for each mode of each light. A single light can require a power wire, a ground wire, as well as multiple additional mode wires to control the various functions of each light on the vehicle. As the number of lights and the number of color and mode options for each light increases, the number of mode wires increases. Thus, the mode wires used for each light device frequently render the lights and light wiring unscalable, cumbersome and unduly limiting with regard to possible functions and options which could be made available on a vehicle.

SUMMARY

Some examples provide a vehicle light control system for managing multimodal light devices using serial data communication. The system includes a plurality of multicolor light devices removably attached to at least a portion of a surface of a vehicle. A light device has a plurality of function modes. A light controller device is communicatively coupled to the plurality of multicolor light devices and a plurality of switch devices. The light controller device also includes at least one memory communicatively coupled to at least one processor. A mode control manager identifies a user-selected mode associated with at least one light device in the plurality of multicolor light devices from the plurality of function modes based on mode selection data received from at least one switch in the plurality of switch devices. The user-selected mode identifying a combination of light colors and a flash pattern of the at least one light device. The mode control manager transmits a data packet, including light mode activation instructions corresponding to the user-selected mode, to the at least one light device via a serial data communication channel. The mode control manager activates the at least one light device to flash the combination of light colors in the flash pattern associated with the user-selected mode via the light mode activation instructions.

Other examples provide a method for managing multimodal light devices via a light control device using serial data communication. Mode selection data is received from at least one switch in a plurality of switch devices on a vehicle. The at least one switch corresponding to a first set of light devices associated with a first zone in a plurality of multicolor light devices on a vehicle. A user-selected mode is identified from a plurality of function modes associated with the first set of light devices based on the mode selection data. A data packet is generated. The data packet includes light mode activation instructions for activating a combination of light colors and a flash pattern corresponding to the user-selected mode of the first set of light devices. The data packet is transmitted to the plurality of multicolor light devices via a serial data communication channel. The first set of light devices are activated to flash the combination of light colors in the flash pattern in accordance with the light mode activation instructions. A second set of light devices remain inactivated by the light mode activation instructions in the data packet.

Still other examples provide a light control device on a vehicle for managing multimodal light devices using serial data communication. The light control device includes a processor and at least one memory communicatively coupled to at least one processor. The at least one memory comprising computer-readable instructions configured to, with the at least one processor, implement a mode control manager. The mode control manager obtains switch data from a first switch in a plurality of switch devices on a vehicle, the first switch corresponding to a first set of light devices associated with a first zone. The light control device transmits a first data packet, including first light mode activation instructions identifying a first combination of colors and a first flash pattern to the first set of light devices via a serial data communication channel. The light control device receives switch data from a second switch in the plurality of switch devices on the vehicle. The second switch corresponding to a second set of light devices associated with a second zone. The light control device transmits a second data packet, including second light mode activation instructions identifying a second combination of colors and a second flash pattern to the second set of light devices via the serial data communication channel. The light control device activates the first set of light devices to flash the first combination of light colors in the first flash pattern in accordance with the first light mode activation instructions and the second set of light devices to flash the second combination of light colors in the second flash pattern in accordance with the second light mode activation instructions.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
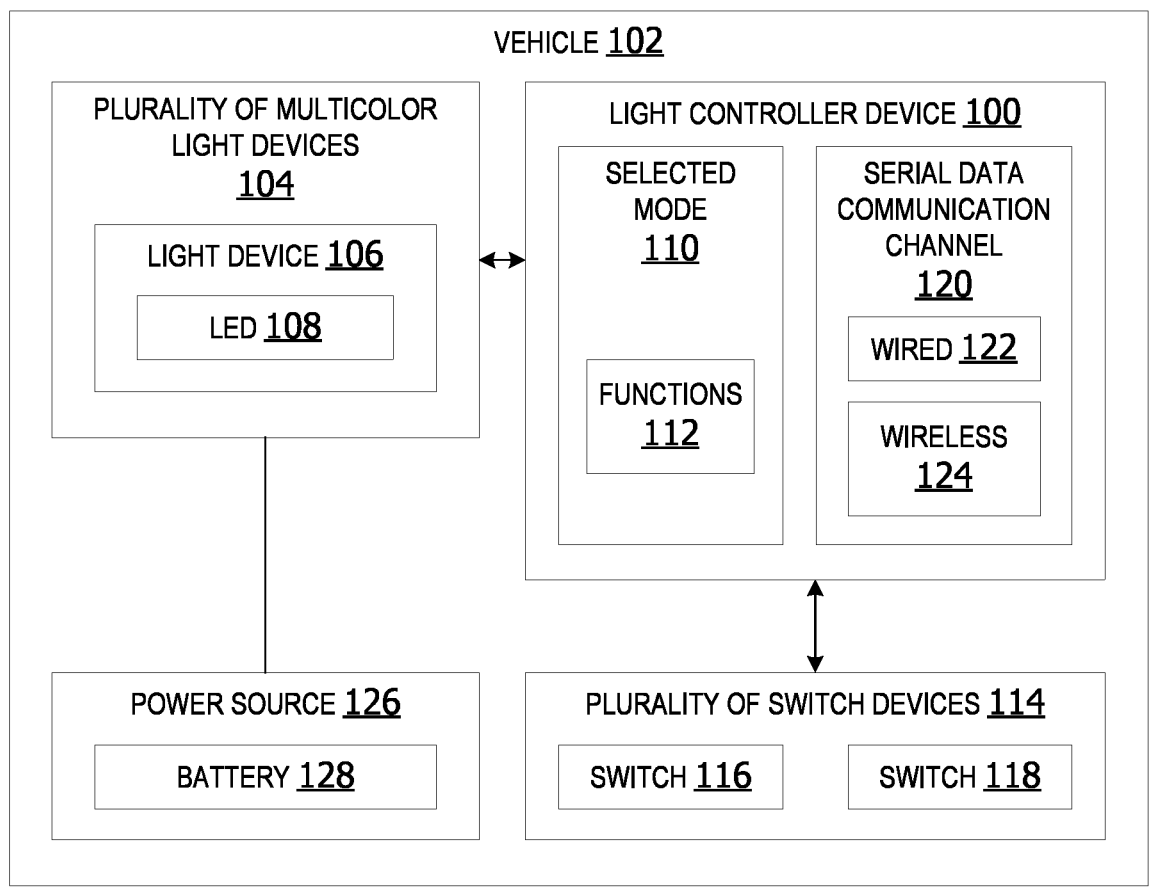
FIG. 1 is an exemplary block diagram illustrating a light controller device for controlling multimode light devices on a vehicle using serial data communication.

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Different types of emergency vehicles utilize different color lights and different flashing light color combinations. For example, tow trucks typically utilize orange, yellow and/or amber colored lights while firetrucks frequently utilize the color red. Moreover, the same types of emergency vehicles in different states frequently use different colors and color combination of lights, as well as different flash patterns. For example, police cars in some states flash the color red, other states use blue, and still other states flash multiple colors, such as red and white or red and blue.

Previous vehicle lighting systems typically included one light device for each color of light and a mode (pattern) wire for each light flash pattern. Thus, utilizing a dual-color light device requires a ground wire, a power wire, a first mode wire for the first color and a second mode wire for the second color. For example, the first mode wire is engaged when the light is amber on the scene and the second mode wire is engaged when the light is red during use as a turn signal. Additional wires would be required for different flash patterns and functions.

When using quad-lights, a different wire is required for each color, a wire for color select and a separate mode wire for each flash pattern. With quad lights, there can be several thousand possible combinations of patterns, colors, and brightness levels when varying each of these properties. This results in too many wires for practical implementation. Due to the limitations of mode wires, a user is typically limited to only a few possible options with regard to colors, flash patterns and functions. Thus, the user is unable to utilize the full range of colors, color combinations, flash patterns and functions available when using multicolor lights due to the prohibitive number of mode wires required to enable more than a handful of color combinations and flash patterns.

Referring to the figures, examples of the disclosure enable a light controller device using serial data communications for managing multimode functions of multicolor lights on a vehicle, such as, but not limited to, an emergency vehicle. The light controller device is an intermediate device between the control switches in the vehicle and the light devices attached to one or more surfaces of the vehicle. The light controller device controls functions of one or more light devices by sending data packets to turn lights on and off in a user-selected flash pattern. The light controller device allows serial wires in place of mode wires. The modes are programmed with software instead of being set with physical mode wires to operate and control functions of multiple lights having multiple color options and multiple available flash patterns. This drastically reduces space requirements and wiring complexity of the lighting system by eliminating mode wires while enabling a greater number of modes, flash patterns and color combinations. This system is scalable due to the ability to add modes, flash patterns and other functional options without increasing the number of wires used by the system.

Referring now to FIG. 1, an exemplary block diagram illustrating a light controller device 100 for controlling multimode light devices on a vehicle 102 using serial data communication is shown. The light controller device 100 is an intermediary device which connects to the light devices on the vehicle 102 and one or more physical light control switch devices in the vehicle. The light controller device 100 can be referred to as a controller, a converter, or an intermediary device.

The vehicle 102 is any type of vehicle for transporting people and/or equipment. In this non-limiting example, the vehicle 102 is an emergency vehicle. An emergency vehicle is a vehicle for responding to emergencies, incidents, accidents, vehicle breakdowns, search and rescue and other situations. Example of emergency vehicles includes police cars, ambulances, fire trucks, search and rescue vehicle, tow truck, or any other type of emergency vehicle. An emergency vehicle can include a manned or unmanned (remote controlled) vehicle. An emergency vehicle can include ground vehicles, aircraft, watercraft, or any other type of vehicle. A ground vehicle can include a sedan, pickup truck, sport utility vehicle (SUV), van, jeep, motorcycle, bus, or any other ground vehicle. A watercraft can include a motorboat, amphibious vehicle, hovercraft, or any other type of water-based vehicle. An aircraft can include a helicopter, airplane, drone, or other air-borne vehicle.

The vehicle 102, in this example, is an emergency vehicle including a plurality of multicolor light devices 104 capable of flashing various light color combinations in a number of user-configurable patterns. A multicolor light device is a light emitting device capable of producing light in multiple different colors. In some non-limiting examples, a light device 106 is a light emitting diode (LED) light capable of producing two different colors (bi-color), three different colors (tri-color), four different colors (quad-color), as well as five or more colors. In this example, the light device 106 is an LED quad-color light device capable of emitting red, blue, white, or amber (yellow) light. With quad-color lights, the user has a possibility of twenty-two (22) different color combinations. However, the light device is not limited to implementation as a quad LED light.

Each light device in the plurality of multicolor light devices can operate in one or more operational modes. A mode is a type or category of light functions. For example, a light can operate in a brake light mode as a brake light that activates automatically when a brake pedal is engaged. The same light can operate in another mode, such as an emergency blinker mode, etc. In an emergency blinker mode, the brake light blinks off and on in at a steady rate/speed and pattern to indicate a vehicle breakdown, immobile vehicle, or other problem.

In another example, a light on a license plate operating in a regular light mode can shine in a white light to illuminate a license plate number or it can operate in an emergency mode in which the light flashes a selected color, such as a red flashing light or a red and white alternating flashing light.

A function of a light refers to an operation or capability, such as, turn on, turn off, dim, blink/flash, a color option, a timer function, etc. The light device 106 functions can include, for example, changing colors, flashing, dimming, altering brightness level, changing a rate/speed of flash, automatically turn on or off, etc.

A light mode can include one or more functions of the light activating in concert while the light is in the user-selected mode. For example, in an emergency mode a light may activate at a given light brightness level and flash a user-configured combination of colors in a user-configured flash pattern or sequence for a given time period.

A light function or mode is activated in response to a user engaging or disengaging a physical switch, such as a brake light activating when a brake pedal (brake switch) is depressed by a user, a turn signal light activating when a turn signal switch is turned on, activating high beams when a high beam headlight switch is turned on, etc. Other lights can activate in response to a vehicle function. A vehicle function refers to a function of the vehicle which triggers a light. For example, hitting the brake pedal to apply the brakes on the vehicle and slow acceleration or stop the vehicle also activates the brake lights. In other words, if a user engages a brake, the vehicle function of braking triggers a brake light activation. Another example of a vehicle function which can activate a light device is backing up. For example, when a user places a vehicle transmission into reverse to backup it triggers backup (reverse) lights to activate warning pedestrians and other drivers that the vehicle is backing up or is preparing to backup.

Still other light devices are activated in response to a condition or event which can be detected using sensor data from one or more sensor devices. In some examples, a headlight turns on automatically when a light detecting sensor detects exterior light levels falling below a threshold level.

The light device 106 is capable of flashing various combinations of lights in multiple different flash patterns at various rates to create a plurality of possible light function modes. With a multicolor light device, there are dozens or even hundreds of possible combinations of lights color, brightness and flash pattern combinations depending on the possible number of light colors and patterns available.

For example, the light device 106 can flash two colors, such as red and blue, in an alternating pattern red-blue-red-blue pattern. In another example, the light device can flash three colors, red, blue, and white in various patterns. One pattern includes alternating the colors red-blue-white-red-blue-white. In another example, the light device 104 can flash three colors in a red-white-blue-white-red-white-blue-white pattern. The light device 106 can also be a steady light of a single color, steady red, or steady white.

A light function or light mode can include a pre-selected combination of light colors, brightness, flash pattern and/or speed of flash for each light device in a given zone. The light device 106 is capable of a plurality of modes.

In some examples, a user selected mode 110 indicates one or more functions 112 of the light device 106 selected by a user activating one or more physical switch devices in a plurality of switch devices 114 within the vehicle 102. A switch device is a physical switch, lever, button, toggle, knob, or other control device. A switch device can also include a graphical control on a user interface device, such as, but not limited to, a graphical icon or graphical button on a touch screen or other display device within the vehicle or on a user interface device. In other examples, a switch is engaged or disengaged via a voice or human speech recognition system which accepts a verbal command or other audio input to engage or disengage a switch.

The plurality of switch devices 114, in this example, are located within a passenger compartment of the vehicle 102. In other examples, a switch device can be located on the light device itself.

Each switch controls a function of one or more light devices in the plurality of multicolor light device 104. In one example, but without limitation, the switch 116 can control the headlights on the vehicle and the switch 118 controls a light on a door of the vehicle. The selected one or more switch devices indicate the user-selected mode 110 for one or more light devices, such as light device 106. In other examples, the mode can be selected via a user interface device rather than using the physical switches.

The light controller device 100 sends a data packet with instructions to activate one or more functions of the light device 106 in accordance with the functions 112 of the selected mode 110 via a serial data communication channel 120. The serial data communication channel 120 is implemented as a wired 122 communication channel or a wireless 124 communication channel. The serial data communication channel replaces and eliminates one or more mode wires associated with each light device.

The wired 122 serial data communication channel includes one or more data wires for transmitting the data packet to the plurality of multicolor light devices 104. In some examples, the wired 122 serial data communication channel is an RS0232 serial connection transmitting signals in device-to-device transmission using a positive voltage for binary and a negative voltage for binary 1. In other examples, the wired 122 serial data communication channel is implemented as a RS-485 serial connection for device-to-device transmission or communication bus to connect to multiple devices at once. In still other examples, the light controller device utilizes a controller area network (CAN) vehicle bus for serial data communication between devices without a host computer. With RS-485, RS-232 and CAN, the serial data communication channel includes two serial data wires, a first data wire and a second data wire.

In still other examples, the wired 122 serial data communication channel is implemented using a local interconnect network (LIN) serial network protocol for communication between devices on the vehicle 102. In these examples, a single data wire is used to connect each light device to the light controller device. The serial data communication is implemented as an Ethernet in other examples. In these examples, six data wires are connected from the light device into the light controller device. However, the examples are not limited to RS-232, RS-485, CAN, Ethernet, or LIN. The wired serial data communication can be implemented using any serial data communication technology.

The wireless 124 serial data communication channel is implemented using any type of wireless communications, such as, but not limited to, BLUETOOTH®, near-field communication (NFC), Wi-Fi, radio frequency (RF), ZIG-BEE®, or other wireless communications technology.

The plurality of multicolor light devices 104 are powered by a power source 126. The power source 126 can include one or more batteries, such as, but not limited to, a battery 128.

Figure 2:
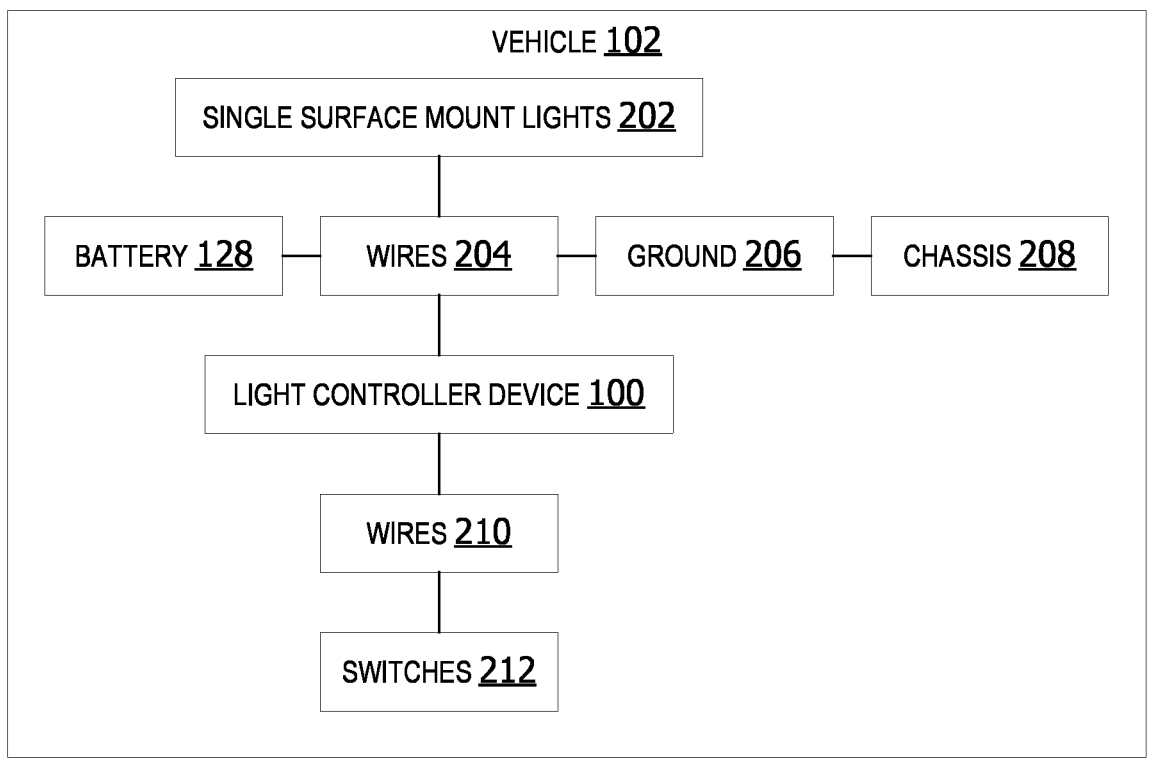
FIG. 2 is an exemplary block diagram illustrating a vehicle having a light controller device for multicolor data control.

Turning now to FIG. 2, an exemplary block diagram illustrating a vehicle 102 having a light controller device 100 for multicolor data control is shown. One or more single surface mount lights 202 are communicatively coupled to a light controller device 100 via a set of one or more wires 204. A single surface mount light is a light device attached to a surface of the vehicle 102. The single surface mount light includes a light attached to an interior or an exterior of the vehicle 102. A single surface mount light can include a headlight, taillight, brake light, rear view mirror light, side mirror light, light on a bumper, light on a door, light on a hood, a license plate light, or any other light attached or coupled to the vehicle. In some examples, the single surface mount lights are removably attached to a surface of the vehicle 102. However, the examples are not limited to light devices which are removably attached. In other examples, a single surface mount light can include a light device which is non-removable.

One wire in the set of wires 204 includes a power wire connected to a power source, such as, but not limited to, a battery 128. Another wire in the set of wires 204 is a ground 206 wire connected to the vehicle 102 chassis 208.

In this non-limiting example, the set of wires 204 includes one or more data wires for transmitting data packets from the light controller device 100 to the single surface mount lights 202. In some examples, the serial data communication channel includes a single data wire running from the light controller device 100 to one or more of the single surface mount lights 202. In this example, a single data wire connects each single surface mount light to the light controller device. Thus, if there are two single surface mount lights, there are two data wires connected to the light controller device 100. One of the data wires connects to the first light device and the second data wire running from the light controller device connects to the second light device. In this non-limiting example, the light controller device utilizes LIN serial network protocol to enable the serial data communication between the light controller device and the plurality of multicolor light devices on the vehicle.

In other examples, the set of wires 204 includes two data wires for each single surface mount light. Each pair of data wires transmits data packets in a single direction from the light controller device 100 to a given single surface mount lights 202. Thus, if there are two single surface mount lights, the set of wires 204 includes four data wires connected to the light controller device. Two of the four data wires connects to the first light device and the other two data wires connect to the second light device.

This reduces the number of mode wires connecting to each of the light devices. Instead of having a separate mode wire for controlling each color and/or function of a given light device, use of the light controller device enables use of only one or two data wires for controlling all the modes and/or functions of the light device. For example, a quad color light device would include at least four wires to control each of the four colors of the light device, as well as additional wires to control different flash patterns and other functions of the light. In this example, the light controller device can transmit instructions for turning a light off, turning a light on, dimming the light, blinking the light, changing color of the light, and/or changing a flash pattern of the light using a single data wire or a pair of data wires instead to control all color changes of functions.

The examples are not limited to one or two data wires. In still other examples, three or more data wires connected to the light controller device 100 to control the modes and/or functions of each single surface mount light.

The light controller device 100 in other examples, can receive diagnostic data from the single surface mount lights 202. In these examples, the data wires transmit data in two directions. The light controller device 100 sends data packets to the light devices and the light devices transmit diagnostic data to the light controller device 100. The diagnostic data is analyzed to determine whether light devices require maintenance, repair and/or replacement. In some examples, the light controller device 100 outputs a recommendation for maintenance, repair and/or replacement of the light devices to a user via a user interface device. In other examples, the light controller device stores the diagnostic data in a data store, maintenance/diagnostic log, and/or transmits the data to a user device, cloud server, cloud storage or other computing device.

A set of one or more wires 210 connects a set of one or more physical switches 212 to the light controller device 100. When a user engages a switch, the switch sends switch data to the light controller device 100. The switch data is used by the light controller device 100 to determine whether which mode from a plurality of function modes of a given light device the user has selected. The light controller device 100 transmits a data packet with instructions for activated the selected function(s) corresponding to the engaged switches 212 to the selected light in the set of single surface mount lights 202.

Figure 3:
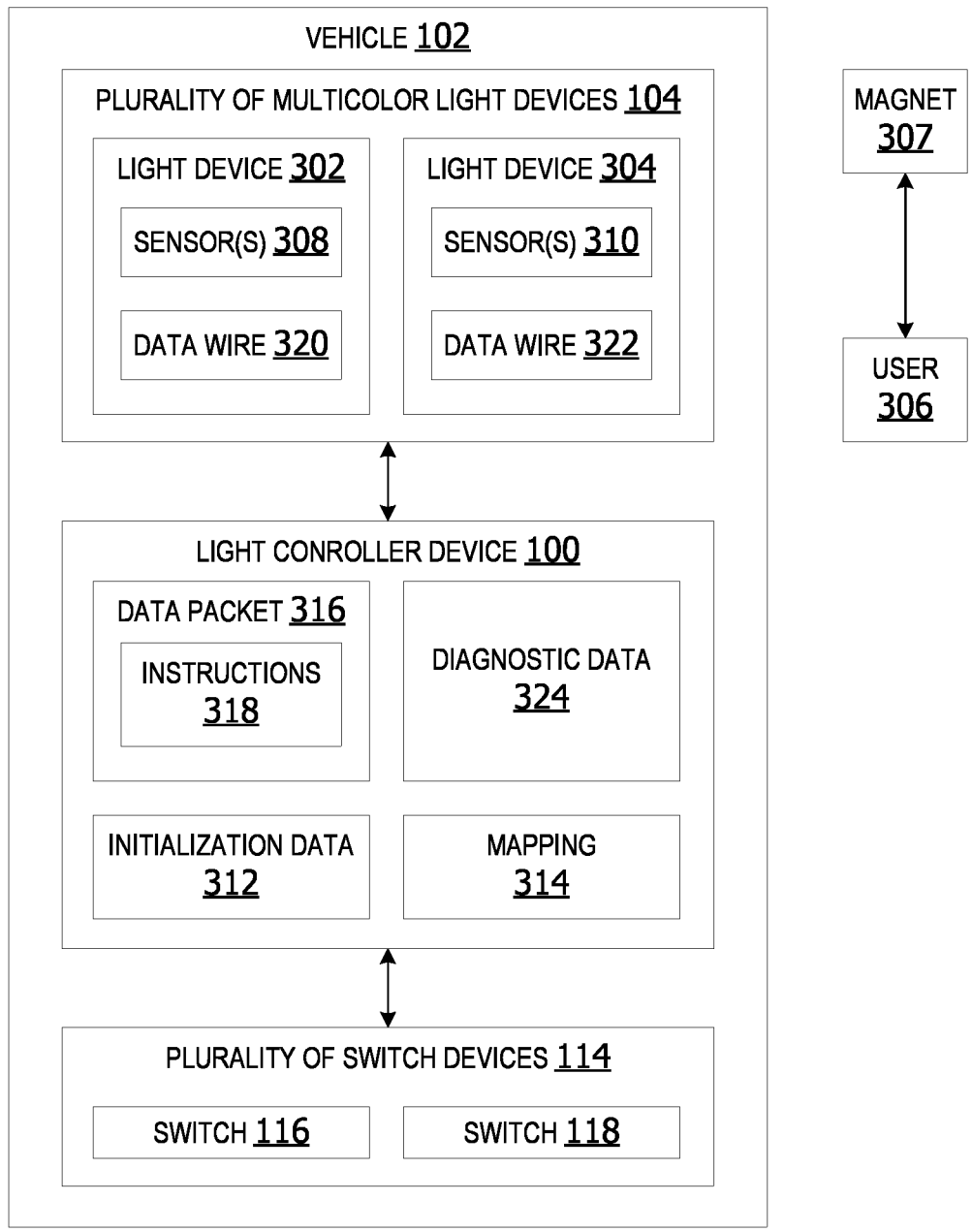
FIG. 3 is an exemplary block diagram illustrating mapping of switch devices to light devices via a set of sensor devices associated with the plurality of multicolor light devices.

FIG. 3 is an exemplary block diagram illustrating mapping of switch devices to light devices via a set of sensor devices associated with the plurality of multicolor light devices 104. The plurality of multicolor light devices 104 in this example includes a first light device 302 and a second light device 304. Each light device includes an initialization sensor device used to map a light device to a switch device in the plurality of switch devices 114.

In some examples, the user selects a zone from a menu of zones on a touch screen to determine what light device is mapped to which zone. The touch screen in these examples is associated with a user interface, such as, but not limited to, the user interface device 1404 in FIG. 14 and/or a user interface on a user device, such as, but not limited to, the user device 1406, shown below. The system can include any number of zones. In this example, there are 16 modes. However, the system can include two zones, as well as three or more zones. The user taps the number of the selected zone. If the light module is not mapped to the selected zone, the module lights up red. If it is already mapped to that zone, then it lights up white. If the user waves a magnet in front of the light module, it turns red. If it is already mapped to the selected zone, it lights up white. If the user waves the magnet in front of the light module it changes from red to white latching the zone number the user has selected to the light module.

The system maps the light head to the selected zone for all future communication with the light device controller. In some examples, when the magnet is waved in front of the light head of a light device, the processor in the light head stores the current user selected zone number or zone identifier in a memory associated with the light head. This maps the light device to the selected zone. The selected zone is associated with one or more switch devices by the controller.

In this example, the user 306 waves a magnet 307 across the light device to activate the initialization sensor 308 during initialization. In some examples, the initialization sensor 308 is a Hall effects sensor. The light changes from red to white when the light device 302 is successfully mapped or paired with the switch 116.

The initialization data 312 transmitted during the mapping 314 of each light device is transmitted to the light controller device via the one or more data wires. In other examples, the diagnostic data 324 is sent by the initialization sensor when the initialization sensor detects the presence or proximity of the magnet 307.

When the switch 116 is mapped to the light device 302, activation of the switch 116 engages the light controller device 100 to send a data packet 316 including instructions to activate the light device 302 to the light device 302 via a data wire 320 connecting the light controller device 100 to the light device 302. In other examples, the light device 304 is communicatively coupled to the light controller device 100 via the data wire 322.

In some non-limiting examples, the plurality of multicolor light devices 104 transmit diagnostic data 324 indicating a functional status of each light device to the light controller device 100 via the one or more data wires, such as, but not limited to, the data wire 320.

In this example, a single data wire connects each light device to the light controller device. However, in other examples, two data wires connect each light device to the light controller device 100, as shown in FIG. 4 below.

Figure 4:
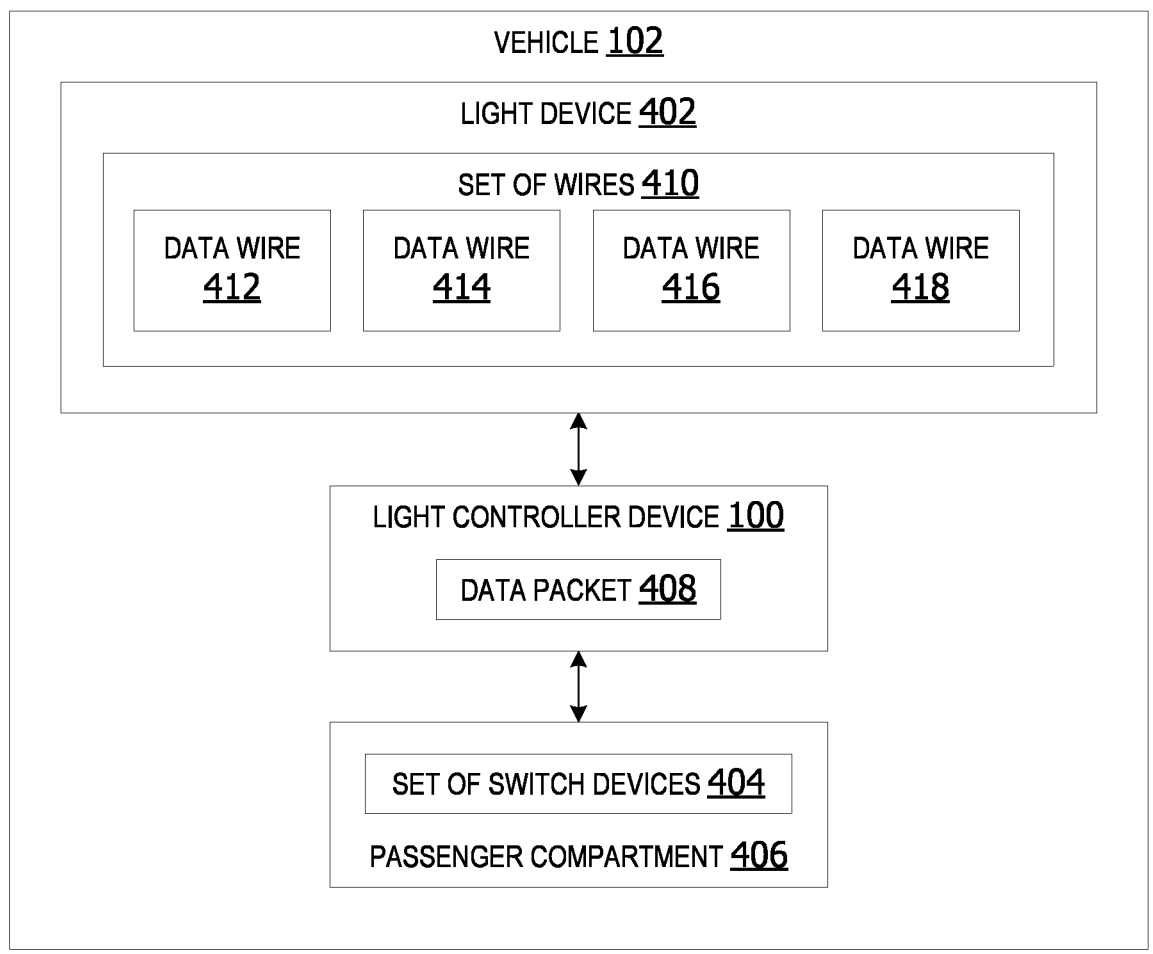
FIG. 4 is an exemplary block diagram illustrating a pair of data wires connecting a light device to a light controller device.

FIG. 4 is an exemplary block diagram illustrating a pair of data wires connecting a light device 402 to a light controller device 100. In this example, a set of switch devices 404 in a passenger compartment of the vehicle 102 connects to the light controller device 100. The set of switch devices 404 communicates with the light controller device 100 via wired or wireless communication. In response to one or more switches being activated to control the light device 402, the light controller device 100 acts as an intermediate device and sends a data packet 408 to the light device 402 via one or more data wires.

In this example, the light device 402 is connected to a set of wires 410. The set of wires 410 includes a first data wire 412, a second data wire 414, a power wire 416 connected to a power supply and a ground wire connected to the vehicle chassis 418. Data is transmitted to the light device 402 from the light controller device 100 via serial data communication across the pair of data wires, including the data wire 412 and the data wire 414. In this non-limiting example, the light controller device is utilizing a serial data communication via a RS-232, an RS-485, or CAN for enabling serial data communication between the light controller device and the plurality of multicolor light devices.

Figure 5:
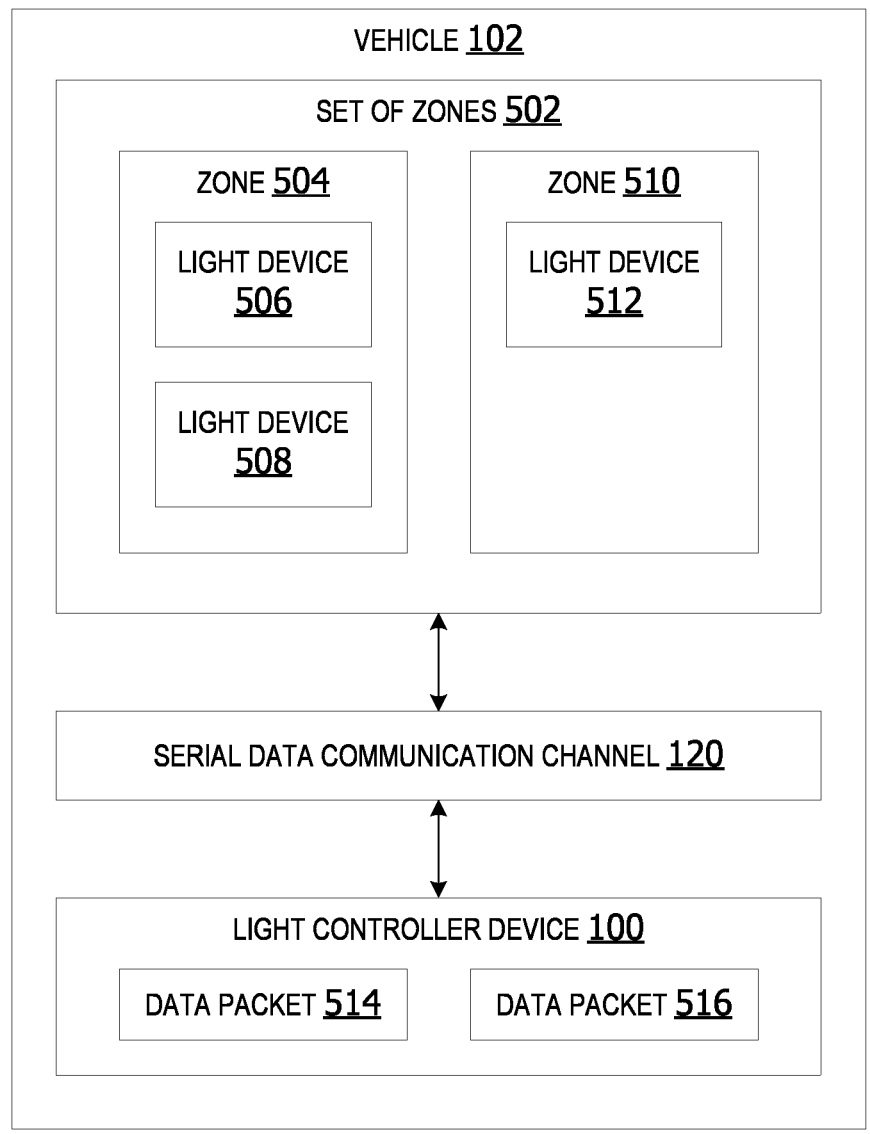
FIG. 5 is an exemplary block diagram illustrating a set of zones including one or more light devices associated with the vehicle.

FIG. 5 is an exemplary block diagram illustrating a set of zones 502 including one or more light devices associated with the vehicle 102. Each zone in the set of zones 502 includes one or more light devices. For example, a first light zone 504 includes light device 506 and light device 508. The first light zone 504 is not limited to two light devices. The zone can include three or more light devices. Data packets transmitted to the light devices in the first light zone 504 control the function or operational mode of all the light devices in the zone. Thus, if a data packet is sent with instructions to flash a combination of red and white lights in a selected flash pattern to zone 504, both light device 506 and light device 508 flash red and white lights in the same selected flash pattern.

In this example, the second light zone 510 includes a single light device 512. The examples are not limited to a light zone having a single light device. The zone can include any number of light devices. When the light controller device 100 sends a data packet 514 to the first light zone 504, the data packet 514 is transmitted along the serial data communication channel 120. Only the light devices 506 and 508 in the first light zone utilize the instructions in the data packet to activate or control the function of the light devices in the first zone. The light device 512 is not impacted by the data packet 514 instructions.

In another example, the data packet 516 is transmitted on the serial data communication channel 120 to the second light zone to control the function and/or operational mode of the light device 512. For example, if the data packet 516 instructions light devices in the second zone to operate in a headlight mode, the light device 512 activates as a white headlight light capable of being dimmed or switched to high beams. However, the function of the other light devices 506 and 508 are not altered by the data packet 516.

Figure 6:
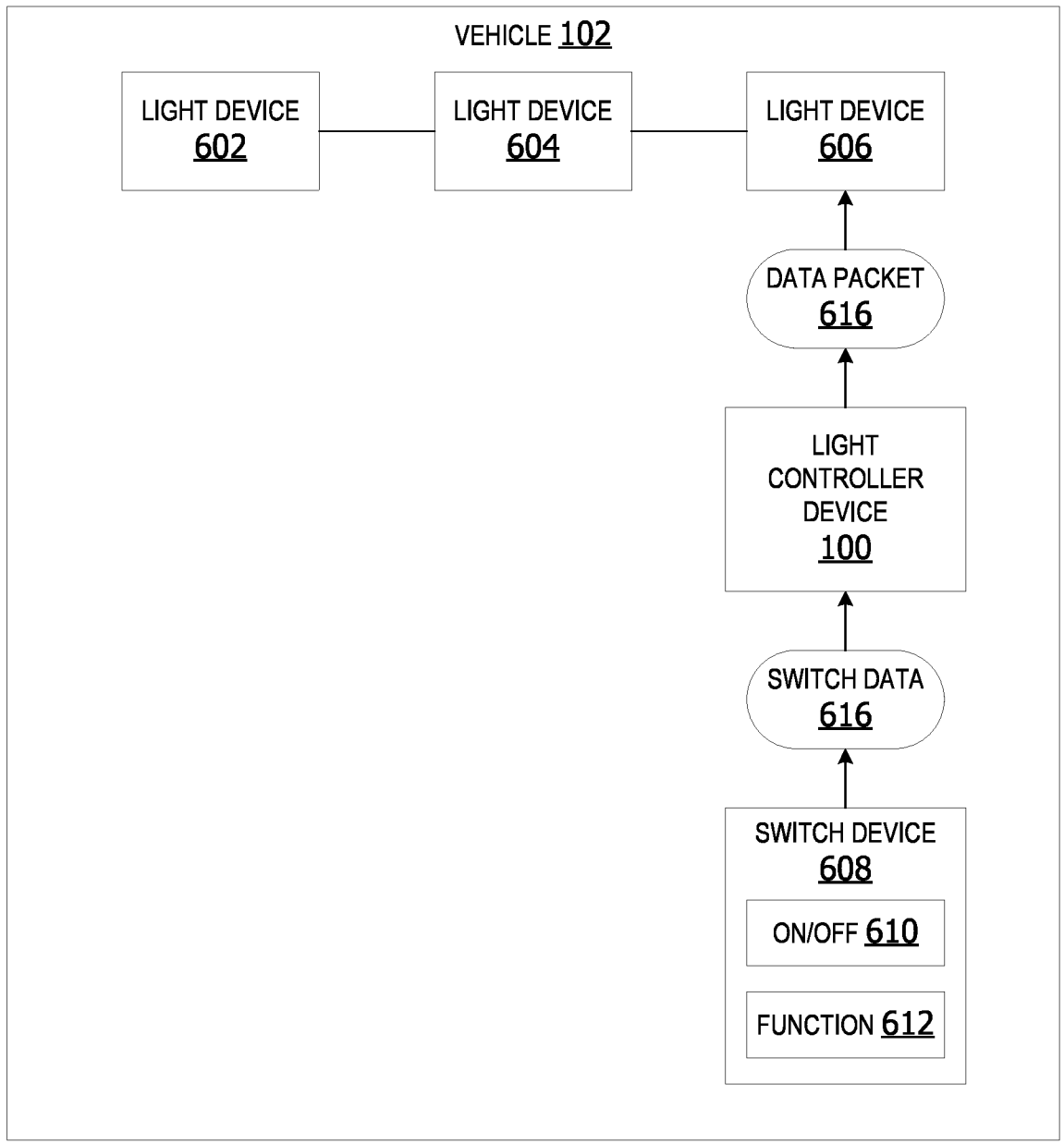
FIG. 6 is an exemplary block diagram illustrating a set of interconnected light devices associated with a light controller device in a vehicle.

Referring now to FIG. 6, is an exemplary block diagram illustrating a set of interconnected light devices associated with a light controller device 100 in a vehicle 102 is shown. In this non-limiting example, the light device 602 is connected to a light device 604 which is connected to a light device 606. The light device 602, light device 604 and light device 606 are daisy chained together using one or more wire connectors to link the devices together on the same chain.

In response to a user activating a switch device 608 to turn a light device 604 on/Off 608 or activate a function 612 of the light, such as flashing or shining high beams, the switch device 608 sends switch data 614 to the light controller device 100. The light controller device 100 analyzes the switch data to determine which light device is mapped to the switch device 608 and which function or mode is selected by the user. If the light device 602, the light device 604 and the light device 606 are in the same light zone and the switch data 614 indicates the light devices should turn on, the light controller device 100 sends the data packet 616 to the daisy chained light devices. All three light devices turn on in response to the data packet 616.

In another example, if the light devices are not in the same zone and the switch data 614 indicates only the light device 604 should turn on, only the light device 604 turns on in response to receiving the data packet 616. The light device 602 and the light device 606 do not turn on in response to the data packet 616.

Figure 7:
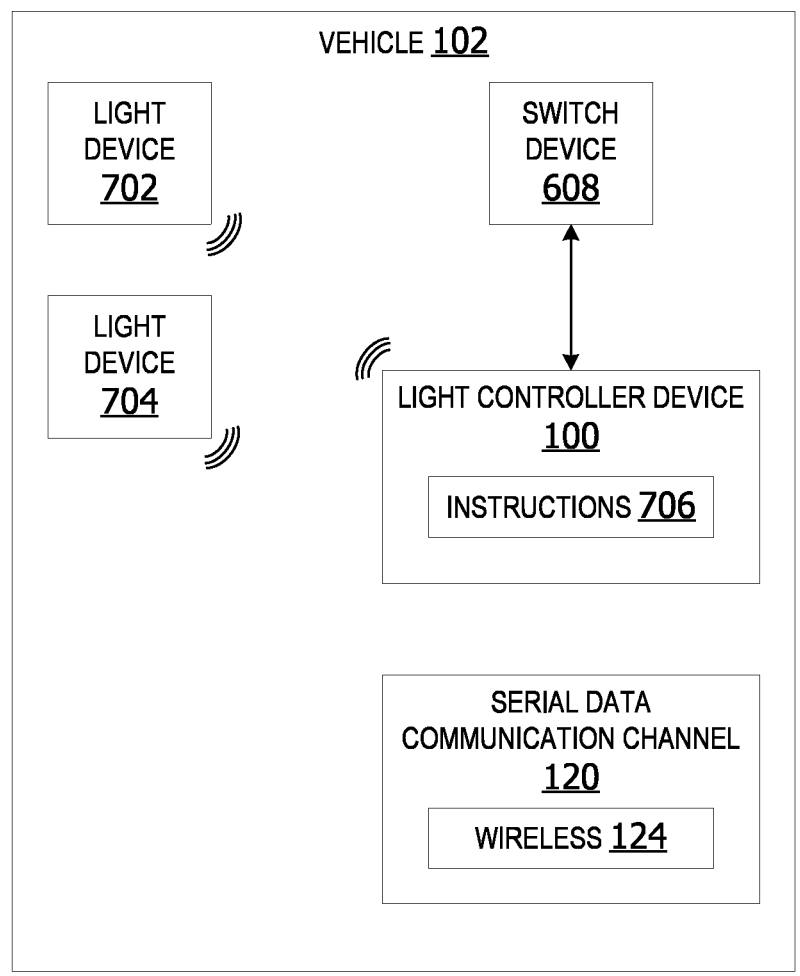
FIG. 7 is an exemplary block diagram illustrating a light controller device using wireless serial data communication for multicolor data control.

FIG. 7 is an exemplary block diagram illustrating a light controller device 100 using wireless serial data communication for multicolor data control. The light device 702 and the light device 704 in this non-limiting example are wireless light devices capable of sending and receiving data via wireless communication, such as, but not limited to, NFC and/or BLUETOOTH®. The light controller device 100 transmits instructions 706 for turning the light device 702 on or off, as well as instructions for activating or deactivating one or more flash patterns, change the brightness level (number of candles of light), dim the light, change the color of the light, or other function of the light device 702 via the wireless 124 serial data communication channel 120.

The examples are not limited to wireless data communication. In other examples, the light controller device 100 can be implemented using wired serial data communication in addition to or instead of wireless data communication.

Figure 8:
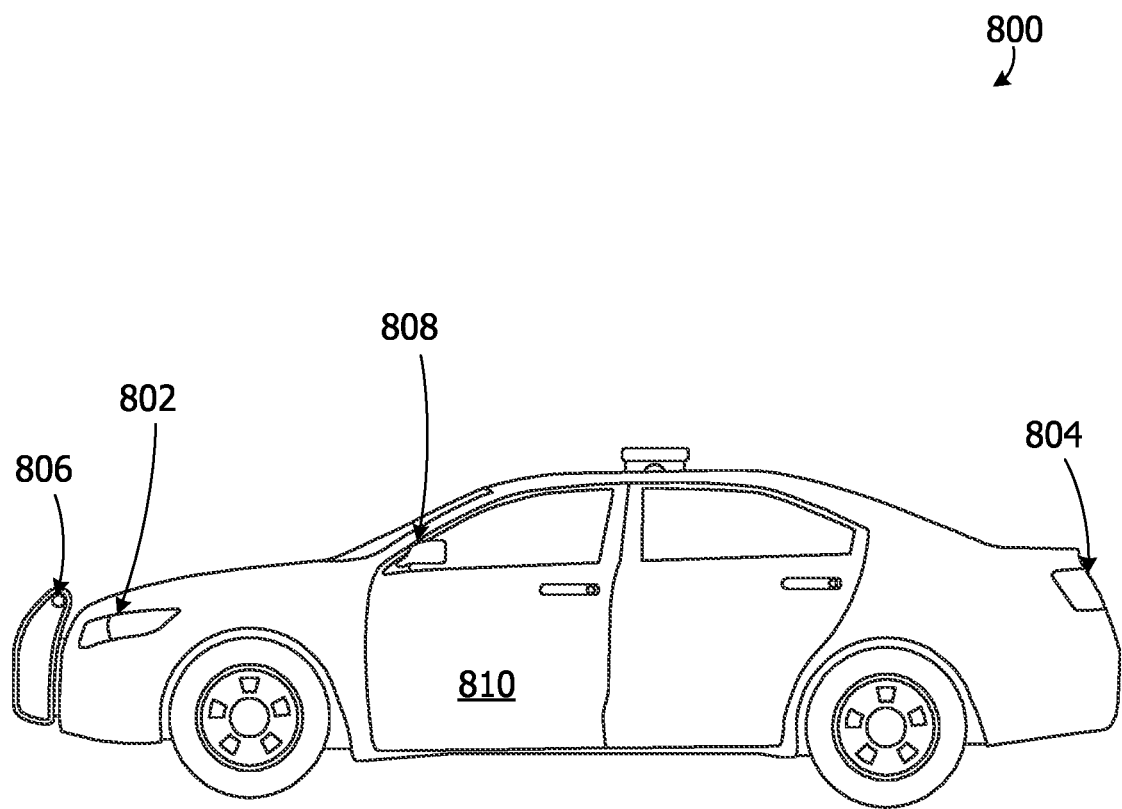
FIG. 8 is an exemplary block diagram illustrating an emergency vehicle sedan 800 including a plurality of lights controlled by a light controller device.

FIG. 8 is an exemplary block diagram illustrating an emergency vehicle sedan 800 including a plurality of lights controlled by a light controller device, such as, but not limited to, the light controller device 100 in FIG. 1 above. The emergency vehicle sedan 800 is a vehicle, such as, but not limited to, the vehicle 102 in FIG. 1 above.

In this example, the plurality of lights includes single surface mount LED light attached to an exterior surface of the emergency vehicle and communicatively coupled to the light controller device via a serial communication data channel at various locations on the vehicle. The plurality of lights, in some non-limiting examples, include the headlights 802, one or more lights on the back bumper 804, one or more lights on the front grill 806, one or more lights on the driver side mirror 808 and/or one or more lights on the driver side door 810. The examples can include other lights not shown in FIG. 8. For example, lights can be included on the passenger side mirror, rear-view mirror, license plate, passenger doors, etc.

Figure 9:
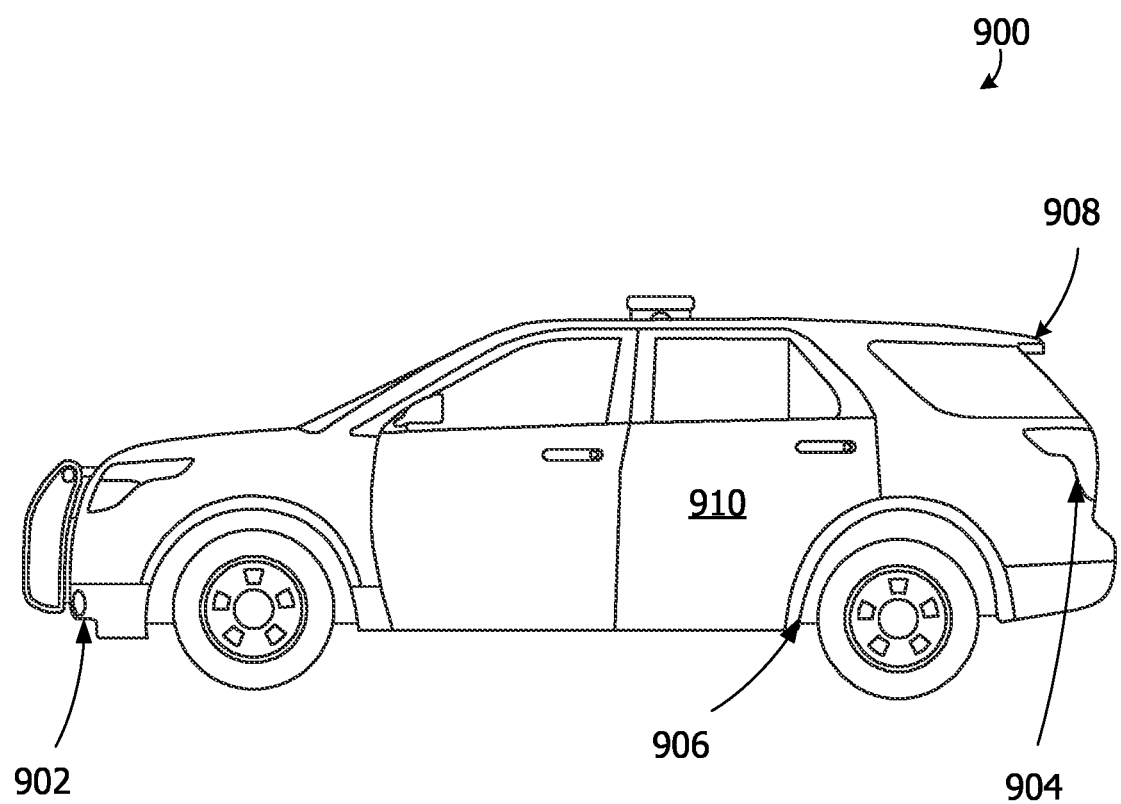
FIG. 9 is an exemplary block diagram illustrating an emergency vehicle sport utility vehicle (SUV) 900 including a plurality of lights controlled by a light controller device.

Turning now to FIG. 9, is an exemplary block diagram illustrating an emergency vehicle sport utility vehicle (SUV) 900 including a plurality of lights controlled by a light controller device is shown. The light controller is a device, such as, but not limited to, the light controller device 100 in FIG. 1 above. The emergency vehicle SUV 900 is a vehicle, such as, but not limited to, the vehicle 102 in FIG. 1 above. In this example, the plurality of lights includes single surface mount LED lights attached to an exterior surface of the emergency vehicle and communicatively coupled to the light controller device via a serial communication data channel.

The light devices in the plurality of light devices includes light devices located on various locations on the exterior of the vehicle and/or within the passenger compartment of the vehicle. In some non-limiting examples, the light devices include one or more light devices located on the front bumper 902, a brake light 904, one or more light devices on a wheel well 906, one or more light devices on or near the back glass 908 and/or one or more lights on a passenger door 910. The examples are not limited to light devices in the locations shown in FIG. 9. In other examples, light devices are located in other locations on the vehicle such as, but not limited to, the headlights, back bumper, side mirror, rear view mirror, grill, or other location on the exterior of the vehicle and/or within an interior of the vehicle.

Figure 10:
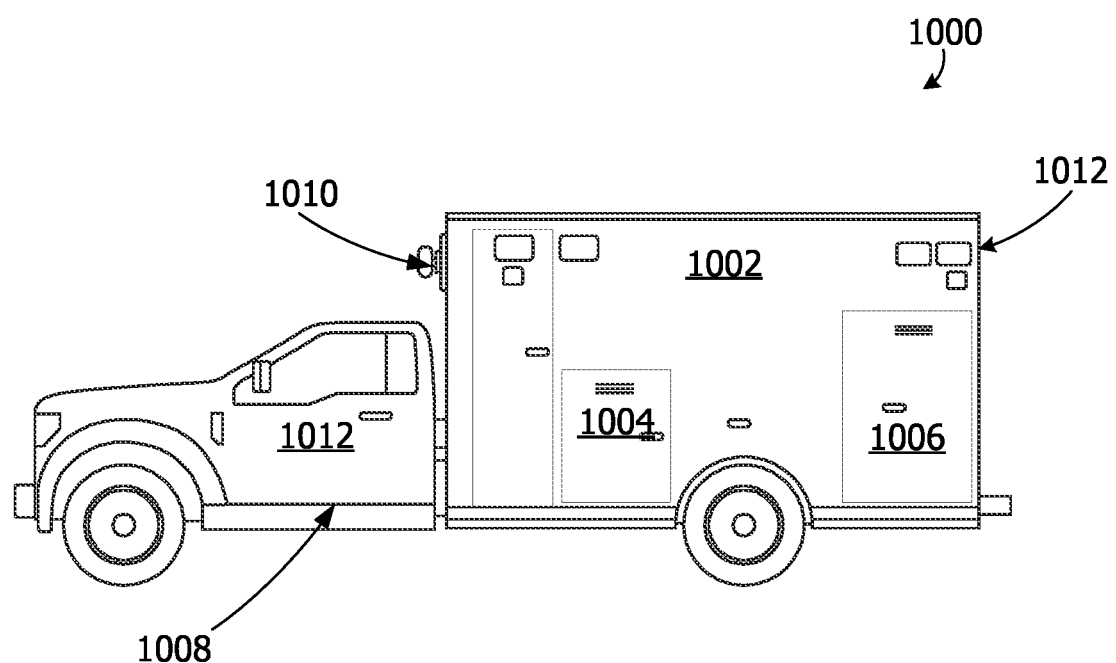
FIG. 10 is an exemplary block diagram illustrating an emergency vehicle pickup truck 1000 including a plurality of lights controlled by a light controller device.

FIG. 10 is an exemplary block diagram illustrating an emergency vehicle pickup truck 1000 including a plurality of lights controlled by a light controller device, such as, but not limited to, the light controller device 100 in FIG. 1 above. The emergency vehicle pickup truck 1000 is a vehicle, such as, but not limited to, the vehicle 102 in FIG. 1 above. In this example, the plurality of lights includes single surface mount LED lights attached to an exterior surface of the emergency vehicle and communicatively coupled to the light controller device via a serial communication data channel.

In some examples, the light devices are located on the side of the side 1002 of the vehicle, on a door 1004 or a door 1006 of an equipment storage compartment, runner board 1008, front 1010 of vehicle, back 1012 of vehicle, and/or on the cab 1014 of the vehicle. The light devices are not limited to the devices or location shown in FIG. 10. The light devices can include headlights, taillights, license plate lights, brake lights/reverse lights, lights on the roof of the vehicle, interior lights, etc. Other examples may include fewer light devices than is shown in FIG. 10 as well as additional light devices not shown in FIG. 10.

Figure 11:
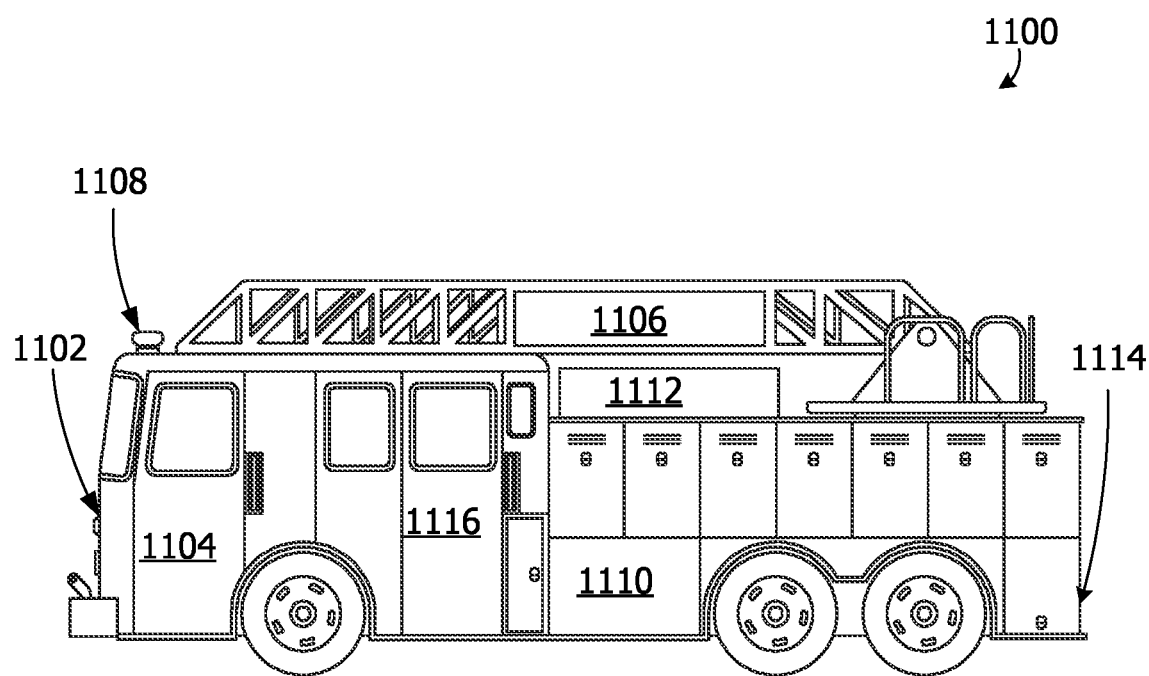
FIG. 11 is an exemplary block diagram illustrating an emergency vehicle firetruck 1100 including a plurality of lights controlled by a light controller device.

FIG. 11 is an exemplary block diagram illustrating an emergency vehicle firetruck 1100 including a plurality of lights controlled by a light controller device, such as, but not limited to, the light controller device 100 in FIG. 1 above. The emergency vehicle firetruck 1100 is a vehicle, such as, but not limited to, the vehicle 102 in FIG. 1 above. In this example, the plurality of lights includes single surface mount LED lights attached to an exterior surface of the emergency vehicle and communicatively coupled to the light controller device via a serial communication data channel.

In some examples, light devices are located on a front 1102 of the cab, side 1104 of the cab, on a ladder 1106, on a roof 1108, on a side 1110, above equipment storage compartments 1112, around a license plate 1114 and/or on back doors 1116. The examples are not limited to light device placements as shown in FIG. 11. In other examples, light devices are located in locations not shown in FIG. 11. Light devices can be located anywhere on an exterior or interior of a vehicle. Other examples may include fewer light devices than is shown in FIG. 11 as well as additional light devices not shown in FIG. 11.

Figure 12:
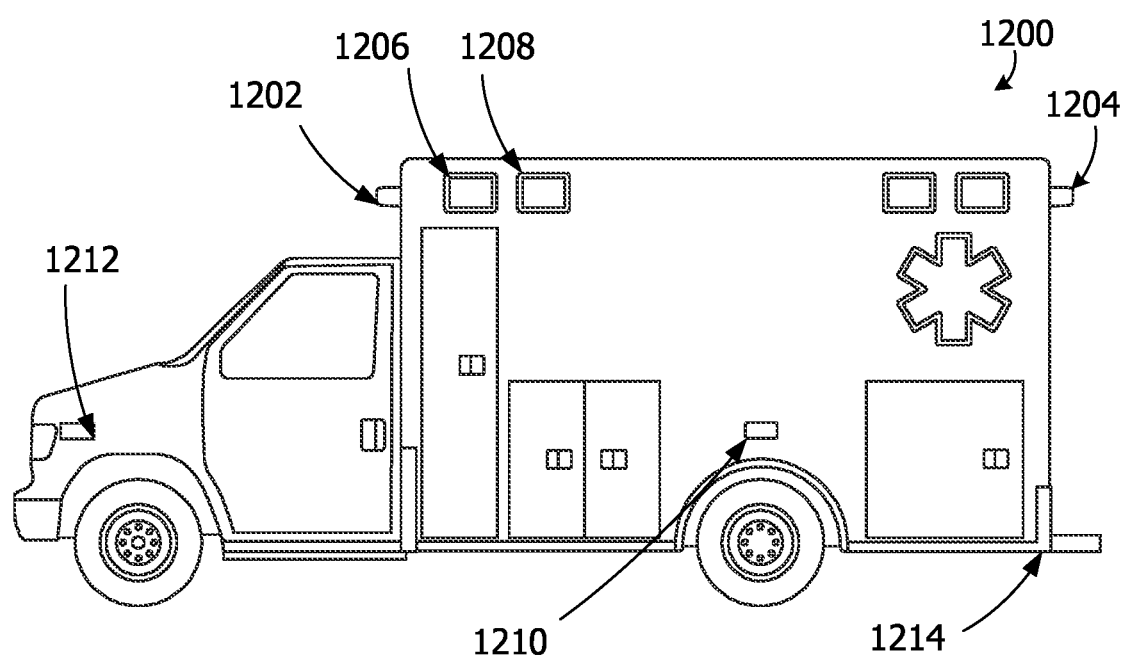
FIG. 12 is an exemplary block diagram illustrating an emergency vehicle ambulance 1200 including a plurality of lights controlled by a light controller device.

Referring now to FIG. 12, an exemplary block diagram illustrating an emergency vehicle ambulance 1200 including a plurality of lights controlled by a light controller device is shown. The controller is a device, such as, but not limited to, the light controller device 100 in FIG. 1 above. The emergency vehicle ambulance 1200 is a vehicle, such as, but not limited to, the vehicle 102 in FIG. 1 above. In this example, the plurality of lights includes single surface mount LED lights attached to an exterior surface of the emergency vehicle and communicatively coupled to the light controller device via a serial communication data channel.

In some examples, the plurality of light devices includes a light device 1202 on the front of the vehicle, a light device 1204 on the back of the vehicle, a light device 1206 and light device 1208 on a side of the vehicle. The plurality of lights optionally also includes a light device 1210 above a wheel of the vehicle, a light device 1212 behind the headlight and/or a light device 1214 near the rear bumper. The examples are not limited to the light devices shown in FIG. 12. The multicolor data control system can include light devices not shown in FIG. 12. Moreover, the system is not required to include all the light devices shown in FIG. 12. Other examples may include fewer light devices than is shown in FIG. 12 as well as additional light devices not shown in FIG. 12.

Figure 13:
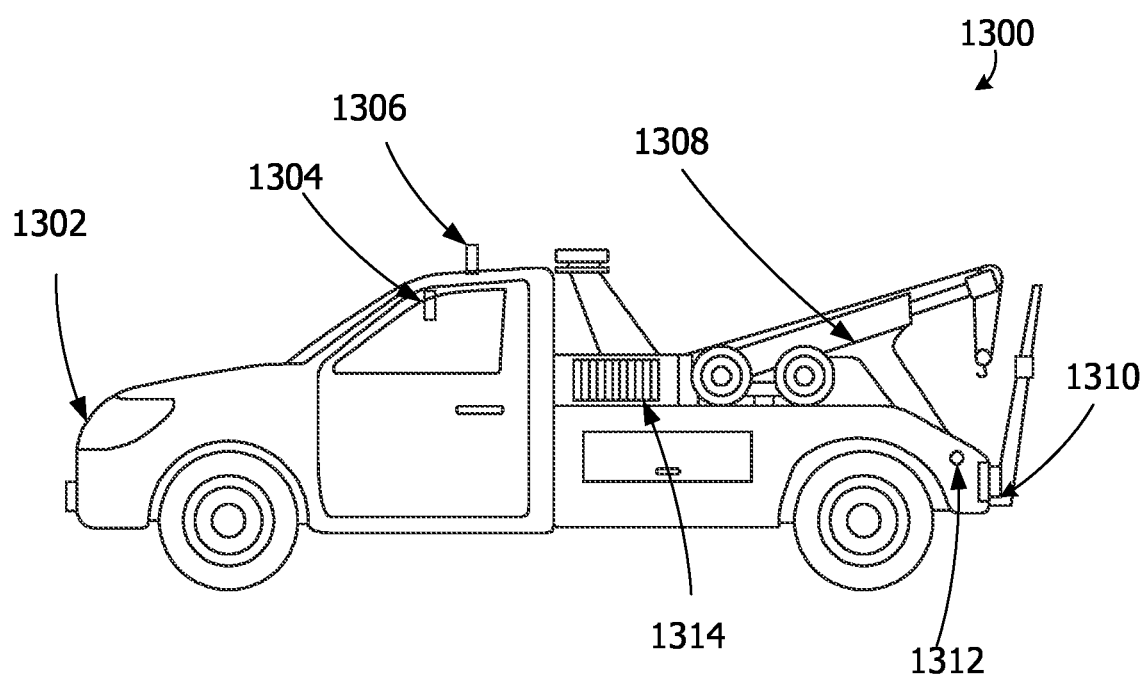
FIG. 13 is an exemplary block diagram illustrating an emergency vehicle tow truck 1300 including a plurality of lights controlled by a light controller device.

FIG. 13 is an exemplary block diagram illustrating an emergency vehicle tow truck 1300 including a plurality of lights controlled by a light controller device, such as, but not limited to, the light controller device 100 in FIG. 1 above. The emergency vehicle tow truck 1300 is a vehicle, such as, but not limited to, the vehicle 102 in FIG. 1 above. In this example, the plurality of lights includes single surface mount LED lights attached to an exterior surface of the emergency vehicle and communicatively coupled to the light controller device via a serial communication data channel.

In some examples, the plurality of light devices includes a headlight device 1302, a rear-view mirror light 1304, a light device 1306 on a roof of the vehicle, a light 1308 on tow equipment, a brake light device 1310, a light device 1312 on a rear bumper and/or a light device 1314 on a side of the tow equipment. The examples are not limited to the light devices depicted in FIG. 13. The multicolor data control system can include light devices not shown in FIG. 13. Moreover, the system is not required to include all the light devices shown in FIG. 13. Other examples may include fewer light devices than is shown in FIG. 13 as well as additional light devices not shown in FIG. 13.

Figure 14:
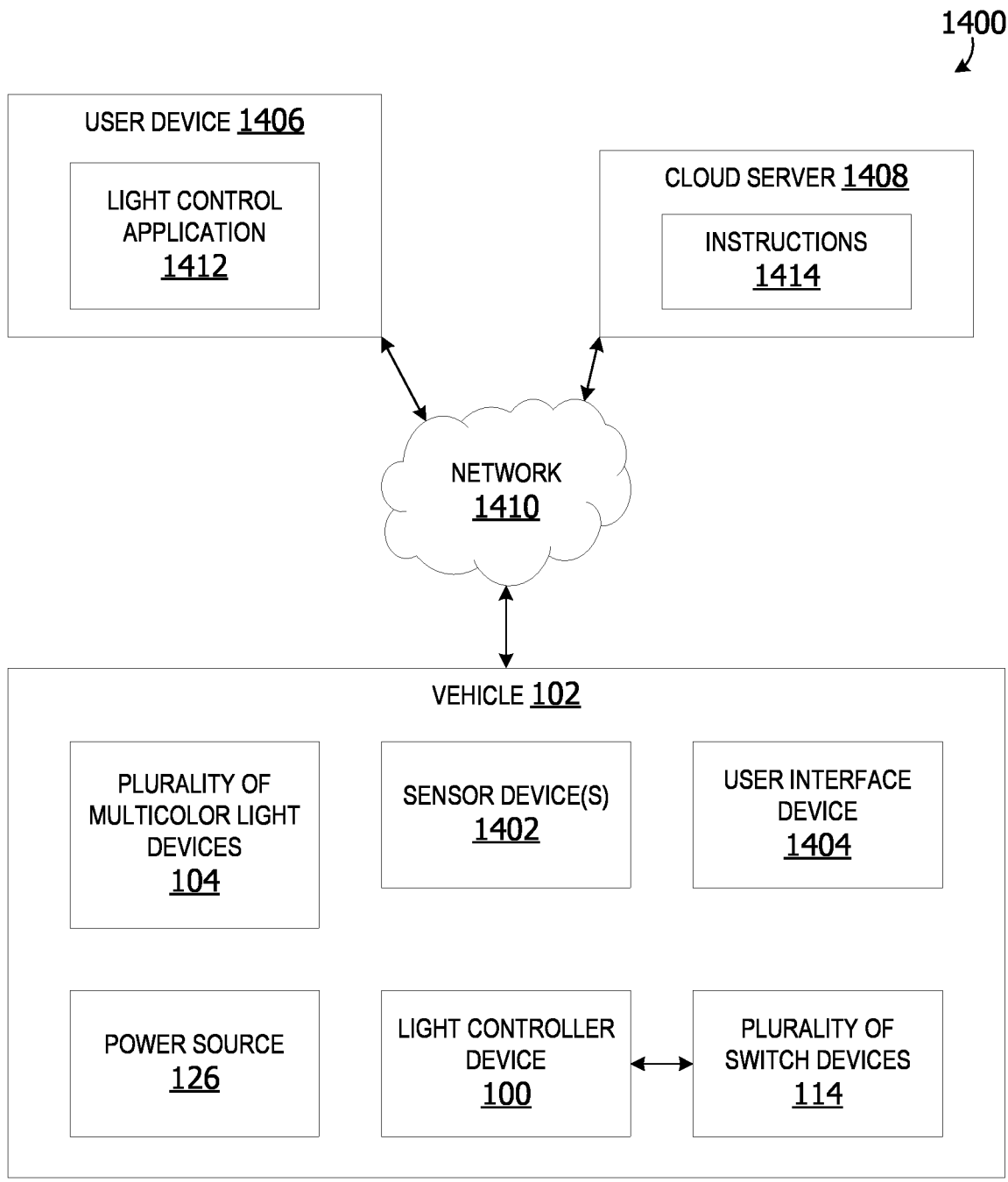
FIG. 14 is an exemplary block diagram illustrating a multicolor data control system including a vehicle light controller device for controlling a plurality of multicolor light devices.

FIG. 14 is an exemplary block diagram illustrating a multicolor data control system 1400 including a vehicle light controller device 100 for controlling a plurality of multicolor light devices 104. In the example of FIG. 14, the vehicle 102 includes a light controller device 100 which acts as an intermediary device between the plurality of multicolor light devices 104 and the plurality of switch devices 114. The light controller device 100 sends instructions to control the function and/or change a mode of operation of one or more light devices based on mode selection data received from one or more sources.

In some examples, the mode selection data includes sensor data obtained from one or more sensor device(s) 1402. The sensor device(s) 1402, in some non-limiting examples, include one or more sensor devices to detect changes in exterior light levels. In response to light levels falling below a predetermined level, the light controller device 100 activates headlights to turn on. Sensor device(s) 1402 in other examples can include sensor to detect skidding, objects near the vehicle, curbs, road signs, an amount of weight on a seat in the passenger compartment, etc. Sensor device(s) 1402 can include, for example but without limitation, one or more pressure sensors, proximity sensors, cameras, motion detectors, light detectors, air bag sensor, accelerometer, parking aid sensors, ambush mode, weight sensors, collision detection sensors, or other sensor devices.

The mode selection data in other examples can include mode selection data or other light function control data received from a user interface device 1404 associated with the vehicle. The user interface device 1404 is implemented as a computing device associated with the user, a user interface device mounted within the passenger compartment of the vehicle, or any other user interface device available to the user. The user input received from the user interface device 1404 indicating a user-selected mode or other user-selected function of the light device(s) is used by the light controller device 100 to control the plurality of multicolor light devices 104.

The user interface device 1404, in some examples, includes a graphics card for displaying data to the user and receiving data from the user. The user interface device 1404 can also include computer-executable instructions (e.g., a driver) for operating the graphics card. Further, the user interface device 1404 can include a display (e.g., a touch screen display or natural user interface) and/or computer-executable instructions (e.g., a driver) for operating the display. The user interface device 1404 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor. In a non-limiting example, the user inputs commands or manipulates data by moving the user interface device 1404 in one or more ways.

In still other examples, the mode selection data includes data received from a remote user device 1406 and/or a cloud server 1408 obtained by the light controller device 100 via a network 1410.

The network 1410 is implemented by one or more physical network components, such as, but without limitation, routers, switches, network interface cards (NICs), and other network devices. The network 1410 is any type of network for enabling communications with remote computing devices, such as, but not limited to, a local area network (LAN), a subnet, a wide area network (WAN), a wireless (Wi-Fi) network, or any other type of network. In this example, the network 1410 is a WAN, such as the Internet. However, in other examples, the network 1410 is a local or private LAN. In this non-limiting example, the network 1410 is a wireless WAN.

The user device 1406 represents any device executing computer-executable instructions. The user device 1406 can be implemented as a mobile computing device, such as, but not limited to, a wearable computing device, a mobile telephone, laptop, tablet, computing pad, netbook, gaming device, and/or any other portable device. The user device 1406 includes at least one processor and a memory. The user device 1406 can also include a user interface device, such as, but not limited to, the user interface device 1404.

The user device 1406 in some examples includes a light control application downloaded onto the user device from a server. The light control application 1412 enables the user to access the light controller device and/or transmit switch data or other mode selection data to the light controller device 100 via the network 1410.

The cloud server 1408 is a logical server providing services to the computing device light controller device 100 or other clients, such as, but not limited to, the user device 1406. The cloud server 1408 is hosted and/or delivered via the network 1410. In some non-limiting examples, the cloud server 1408 is associated with one or more physical servers in one or more data centers. In other examples, the cloud server 1408 is associated with a distributed network of servers. The cloud server 1408 in some examples transmits instructions for turning one or more light device on or off, changing a mode of the light device(s), dimming the light, changing the color combinations, changing the flash pattern, etc. Thus, the light controller device can optionally receive mode selection data from sensor device(s), a user interface, a remote user device, a cloud server and/or one or more physical switch devices on the vehicle.

Figure 15:
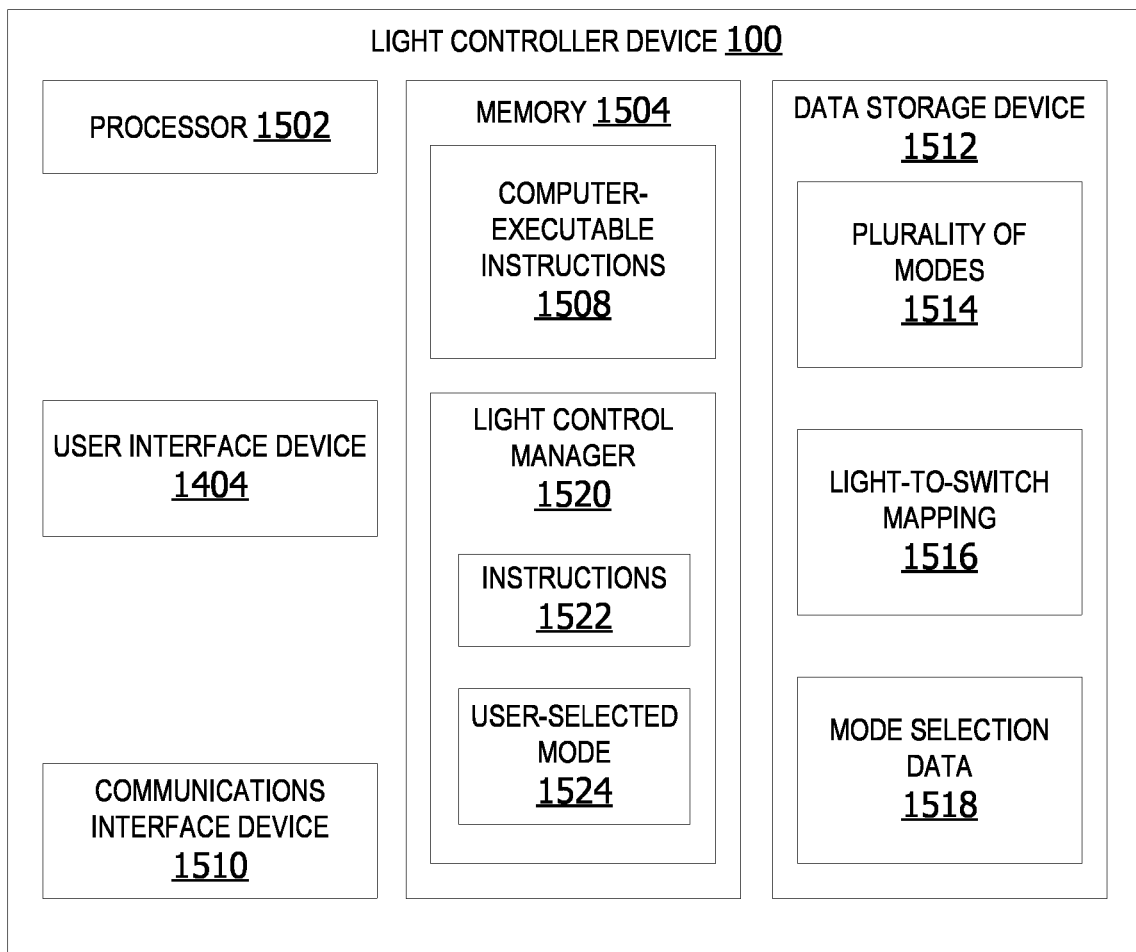
FIG. 15 is an exemplary block diagram illustrating a light controller device.

FIG. 15 is an exemplary block diagram illustrating a light controller device 100. In some examples, the light controller device 100 has at least one processor 1502 and a memory 1504. The light controller device 100 can optionally include a user interface device 1506. However, in other examples, the user interface is a separate component from the light controller device, as shown in FIG. 14 above.

The processor 1502 includes any quantity of processing units, and is programmed to execute computer-executable instructions 1508. The computer-executable instructions 1508 is performed by the processor 1502, performed by multiple processors within the light controller device 100 or performed by a processor external to the light controller device 100. In some examples, the processor 1502 is programmed to execute instructions such as those illustrated in the figures (e.g., FIG. 19, FIG. 20, FIG. 21, FIG. 22, and FIG. 23).

The light controller device 100 further has one or more computer-readable media such as the memory 1504. The memory 1504 includes any quantity of media associated with or accessible by the light controller device 100. The memory 1504, in these examples, is internal to the light controller device 100 (as shown in FIG. 15). In other examples, the memory 1504 is external to the light controller device 100 (not shown) or both (not shown). The memory 1504 can include read-only memory and/or memory wired into an analog computing device.

The memory 1504 stores data, such as one or more applications. The applications, when executed by the processor 1502, operate to perform functionality on the light controller device 100. The applications can optionally communicate with counterpart applications or services such as web services accessible via a network.

In other examples, the user interface device 1506 includes a graphics card for displaying data to the user and receiving data from the user. The user interface device 1506 can also include computer-executable instructions (e.g., a driver) for operating the graphics card. Further, the user interface device 1506 can include a display (e.g., a touch screen display or natural user interface) and/or computer-executable instructions (e.g., a driver) for operating the display. The user interface device 1506 can also include one or more of the following to provide data to the user or receive data from the user: speakers, a sound card, a camera, a microphone, a vibration motor, one or more accelerometers, a BLUETOOTH® brand communication module, global positioning system (GPS) hardware, and a photoreceptive light sensor.

In some examples, the light controller device 100 optionally includes a communications interface component 1510. The communications interface component 1510 includes a network interface card and/or computer-executable instructions (e.g., a driver) for operating the network interface card. Communication between the light controller device 100 and other devices can occur using any protocol or mechanism over any wired or wireless connection. In some examples, the communications interface component 1510 is operable with short range communication technologies such as by using near-field communication (NFC) tags.

The light controller device 100 can optionally include a data storage device 1512 for storing data, such as, but not limited to a plurality of modes 1514 for the light devices, light-to-switch mapping 1516 data, and/or mode selection data 1518. The data storage device 1512 can include one or more different types of data storage devices, such as, for example, one or more rotating disks drives, one or more solid state drives (SSDs), and/or any other type of data storage device. The data storage device 1512 in some non-limiting examples includes a redundant array of independent disks (RAID) array. In other examples, the data storage device 1512 includes a database.

The data storage device 1512 in this example is included within the light controller device 100, attached to the light controller device 100, plugged into the light controller device 100, or otherwise associated with the light controller device 100. In other examples, the data storage device 1512 includes a remote data storage accessed by the light controller device 100 and/or vehicle via the network, such as a remote data storage device, a data storage in a remote data center, or a cloud storage.

The memory 1504 in some examples stores one or more computer-executable components. Exemplary components include a light control manager 1520. The light control manager 1520 is a software component for analyzing mode selection data to identify a user-selected mode 1524 for a light device or light devices in a zone. The light control manager 1520 generates and transmits instructions to the light device or light devices in the selected zone. The instructions 1522 instruct the light device or light devices in the zone to turn on, turn off, activate a function, or de-activate a given function.

Figure 16:
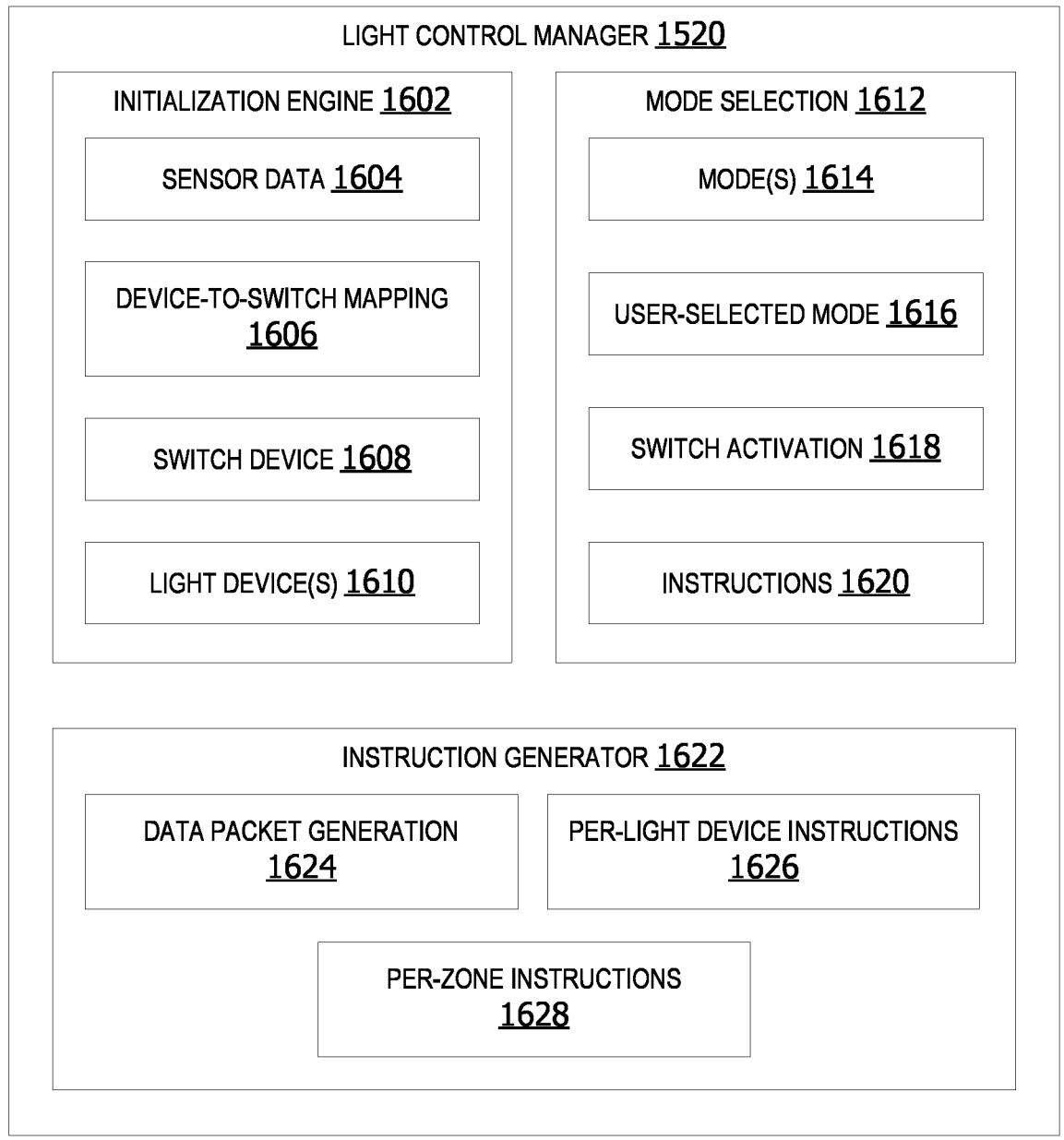
FIG. 16 is an exemplary block diagram illustrating a light control manager.

FIG. 16 is an exemplary block diagram illustrating a light control manager 1520. The light control manager 1520 in some non-limiting examples is a software component including user-configured light control logic for controlling multicolor and multimodal light devices on a vehicle.

The light control manager 1520 in some examples includes an initialization engine 1602. Every light device on the vehicle is wired into a single light controller device. Likewise, all the switch devices are wired into the same light controller device. Because the light devices are not wired directly into the switch devices, the initialization engine 1602 maps the light device locations to switch devices so that the system knows which switch activates or deactivates which light device on the vehicle.

In some examples, the initialization engine 1602 utilizes sensor data 1604 received from one or more sensors, such as, but not limited to, a Hall effects sensor in a light device, to perform device-to-switch mapping 1606. The device-to-switch mapping 1606 maps the location of each light device to a switch. The mapping in this example maps the switch device 1608 to one or more light device(s) 1610 associated with the emergency vehicle.

The light control manager 1520 in other examples includes a mode selection 1612 software component which analyzes mode selection data received from physical switches, sensor data, vehicle function data, and/or other data received from a user device to identify a user-selected mode 1616 from a plurality of available mod(s) 1614. The user-selected mode 1616 in some examples is identified in response to a physical switch activation 1618 and/or instructions 1620 received from a user device, user interface or cloud server.

In yet other examples, an instruction generator 1622 generates a data packet including per-light device instructions 1626 or per-zone instructions 1628. The per-light device instructions 1626 are instructions to control a function or mode of a specific light device on the vehicle. Per-zone instructions 1628 are instructions to control the function or mode of two or more light devices in a single light device zone associated with the vehicle.

Figure 17:
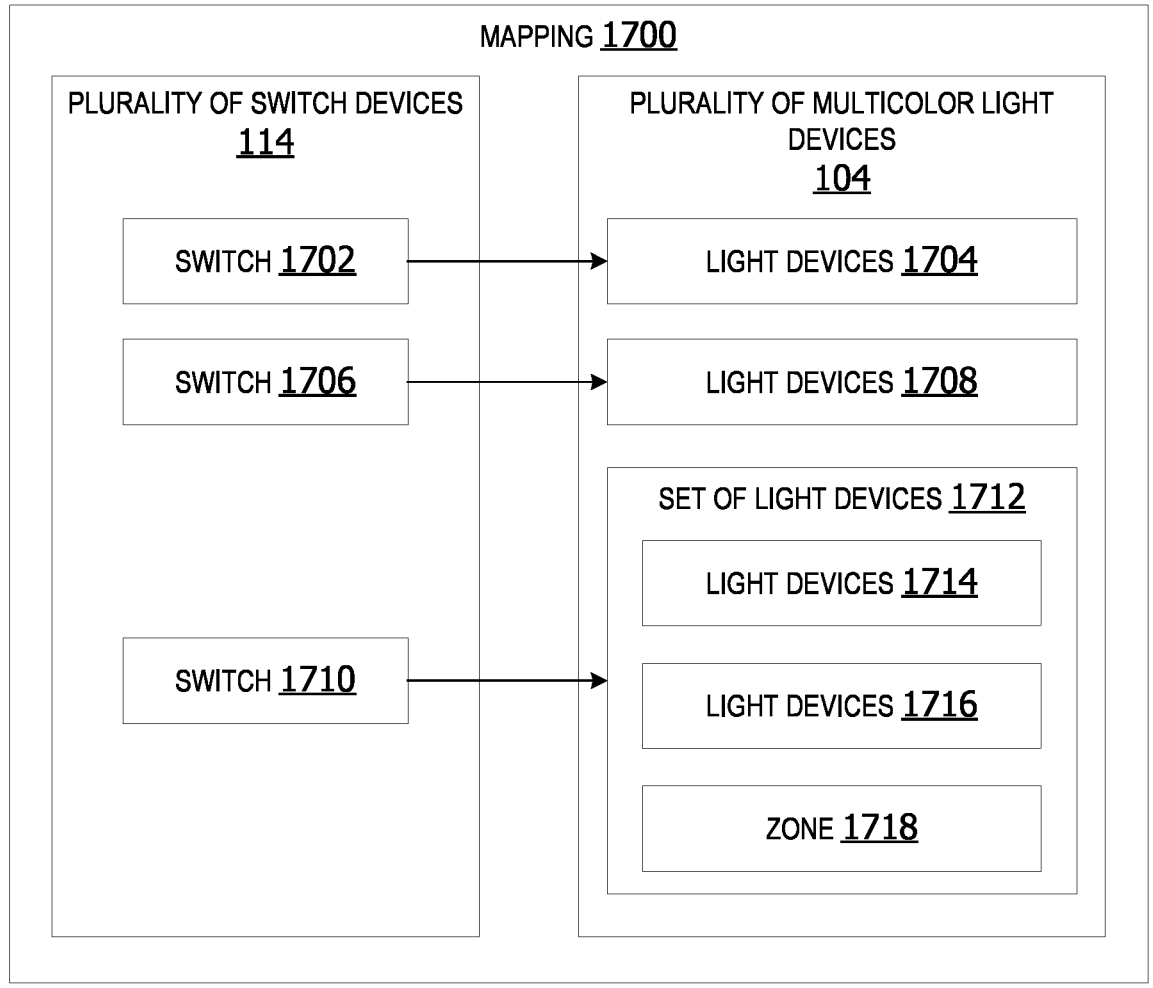
FIG. 17 is an exemplary block diagram illustrating a mapping of switch devices to light devices.

FIG. 17 is an exemplary block diagram illustrating a mapping 1700 of switch devices to light devices. In this example, a first switch 1702 in the plurality of switch devices 114 is mapped to a first light device 1704 of the plurality of multicolor light devices 104. A second switch 1706 is mapped to the light device 1708. A switch 1710 is mapped to a set of light devices 1712. The set of light devices 1712 includes one or more light devices within a light device zone 1718. In this example, the zone 1718 includes two devices, a light device 1714 and a light device 1716. The examples are not limited to two light devices in a single zone. A zone can include any number of light devices, such as, but not limited to, a single light device, as well as three or more light devices.

Mapping is performed to identify the location of each light device which is associated with a switch on the vehicle using a Hall effects sensor on each light device. In some examples, a magnet of a certain polarity is waved near the light device and acts like a switch. The sensor includes a processor (microchip) located inside the sensor which detects the magnet and triggers light color change if the light module is mapped to the selected switch device/zone. When the magnet is within a proximity of the sensor, it triggers the sensor to activate the light. The light is initially red to indicate the light device is in an initialization (calibration) mode. The initialization mode can also be referred to as a calibration mode. Once the light device is initialized (mapped to a switch), the light turns from red to white to indicate to the user that the initialization is complete.

A light device can be initialized as a single light unit or as a member of a group of light devices in a zone. All lights in a given zone are synchronized. All lights in the same zone receive the same instructions in the same data packet. The instructions indicate whether the light should turn on, turn off, color, flash pattern, etc.

Figure 18:
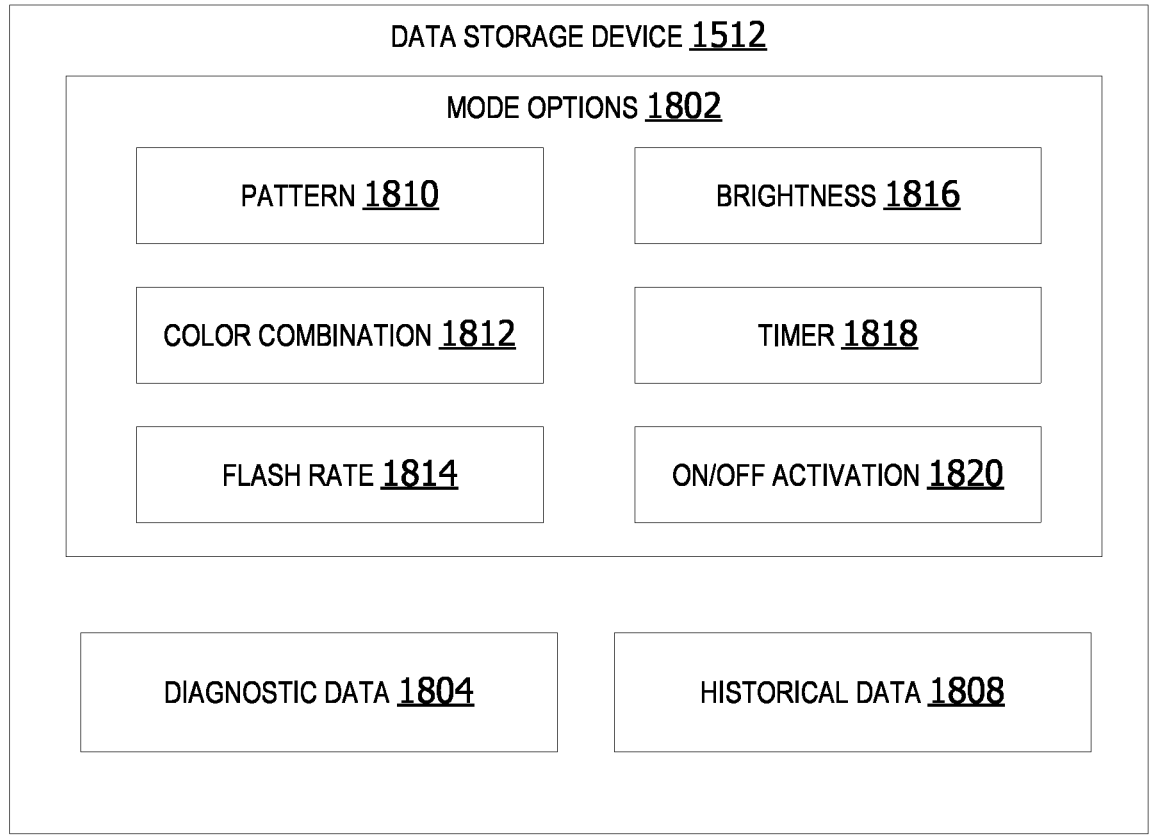
FIG. 18 is an exemplary block diagram illustrating a data storage device storing multicolor light control data.

FIG. 18 is an exemplary block diagram illustrating a data storage device 1512 storing multicolor light control data. In this example, the data storage device includes mode options 1802, diagnostic data 1804 and/or historical data 1808. The mode options 1802 includes functions and modes of the light device(s), such as, but not limited to, pattern 1810 of flashing, color combination 1812, flash rate (speed) 1814, brightness 1816, timer 1818 and/or on/off activation 1820. A timer 1818 refers to a timer function for automatically turning a light on or off. For example, a light may be set to automatically turn off after it has been illuminated for a pre-determined or user-configured period of time. The historical data 1808 includes data associated with previous use of light devices, previous settings, historical mode selection data, etc.

Figure 19:
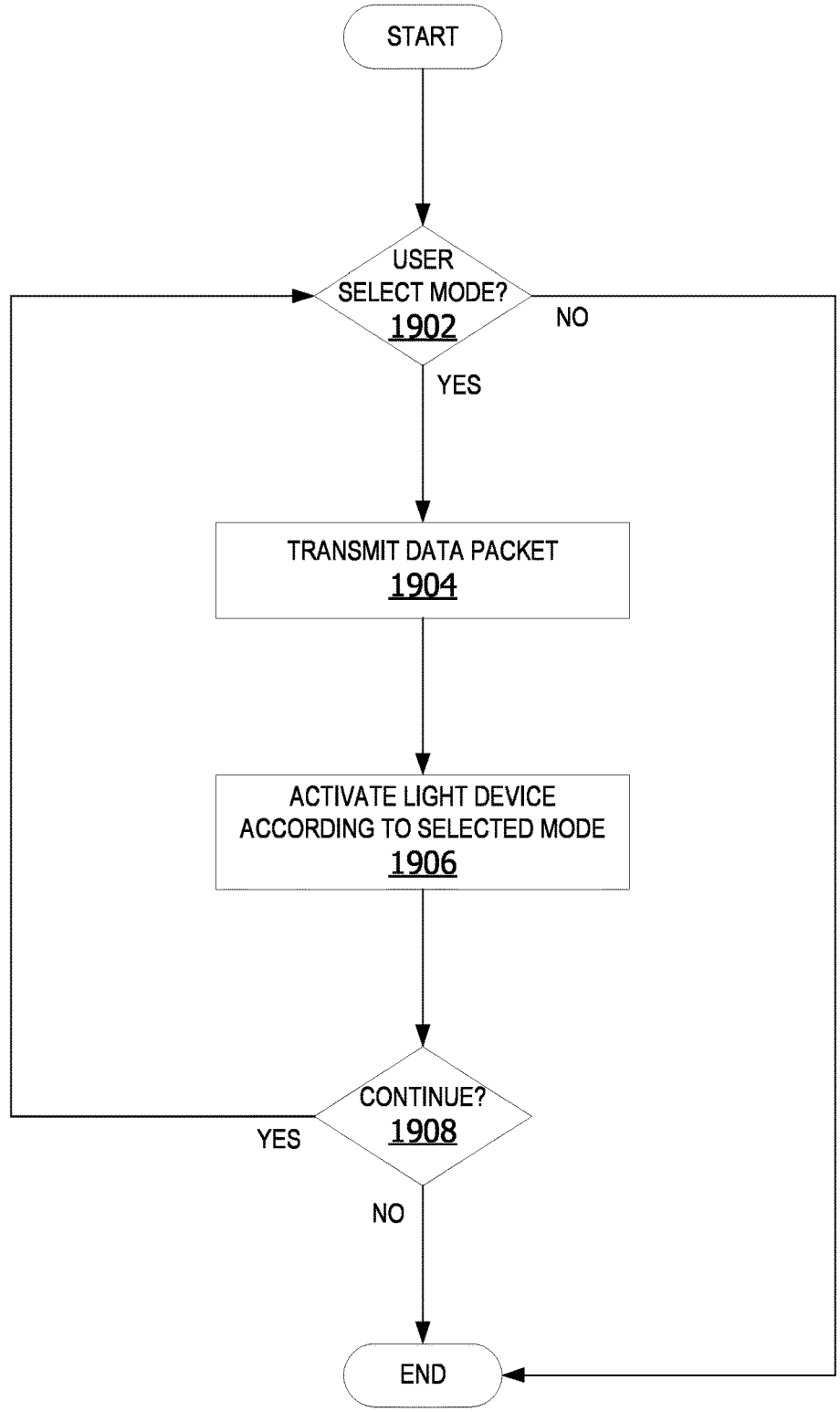
FIG. 19 is an exemplary flow chart illustrating operation of the light controller device to activate a light device in accordance with a user selected mode.

FIG. 19 is an exemplary flow chart illustrating operation of the light controller device to activate a light device in accordance with a user selected mode. The process shown in FIG. 19 is performed by a light control manager executing on a controller device, such as the light controller device 100 in FIG. 1.

The process begins by determining whether a user has selected a mode at 1902. A user selects a mode by engaging a physical switch in the vehicle, selecting a mode using a user interface and/or uploading a mode selection from a user device. The light controller device transmits a data packet, including instructions for engaging the user-selected mode, to a selected light device using serial data communication at 1904. The light device is activated according to the selected mode by the instructions in the received data packet at 1906. A determination is made whether to continue at 1908. If yes, the light control manager iteratively executes operations 1902 through 1908, until a determination is made to no longer continue. The process terminates thereafter.

Figure 20:
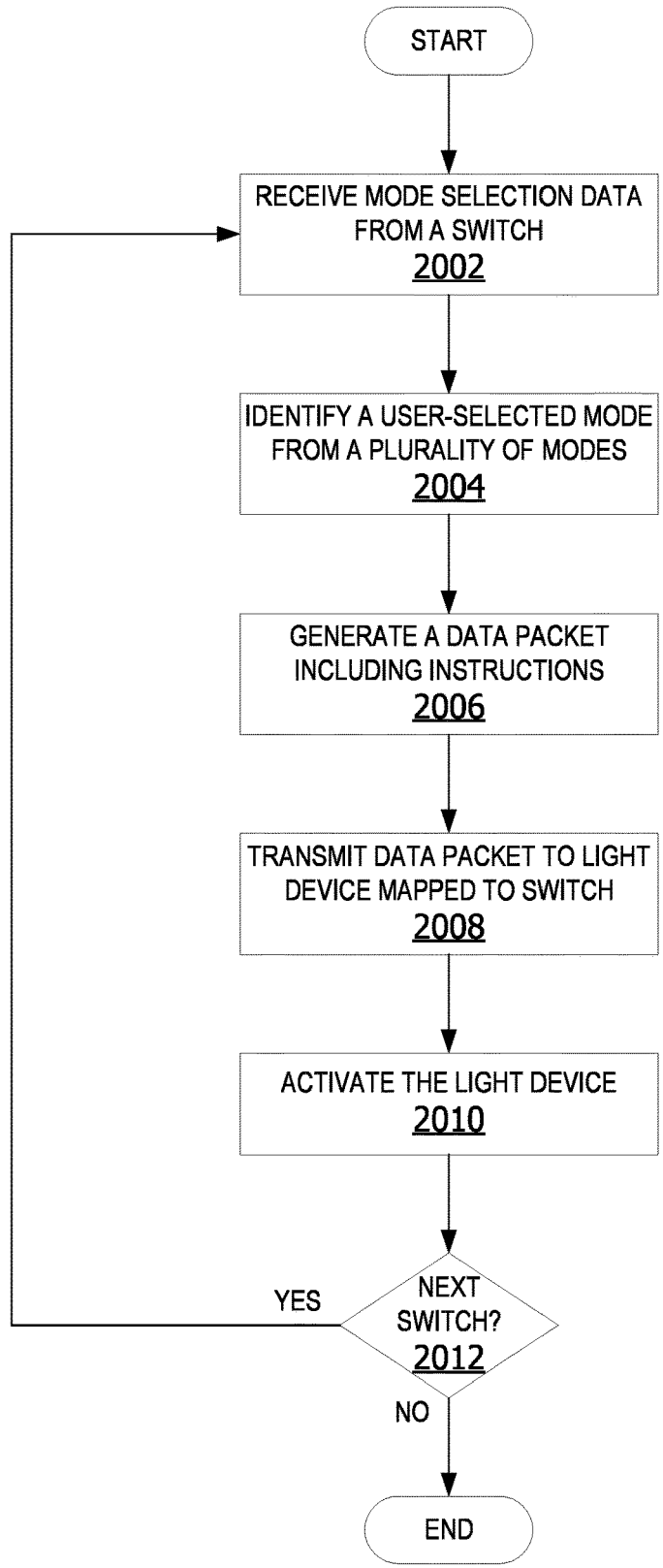
FIG. 20 is an exemplary flow chart illustrating operation of the light controller device to transmit a data packet to activate a light device mapped to a switch.

FIG. 20 is an exemplary flow chart illustrating operation of the light controller device to transmit a data packet to activate a light device mapped to a switch. The process shown in FIG. 20 is performed by a light control manager executing on a controller device, such as the light controller device 100 in FIG. 1.

The process begins by receiving mode selection data from a switch at 2002. A user-selected mode is identified from a plurality of modes for the light devices on the vehicle at 2004. A data packet, including instructions, is generated by the light control manager at 2006. The data packet is transmitted to a light device mapped to the switch using a serial data communication channel at 2008. The light device is activated at 2010. A determination is made whether a next switch is activated or deactivated at 2012. If yes, the light control manager iteratively executes operations 2002 through 2012 until a next switch is not activated or de-activated at 2012. The process terminates thereafter.

Figure 21:
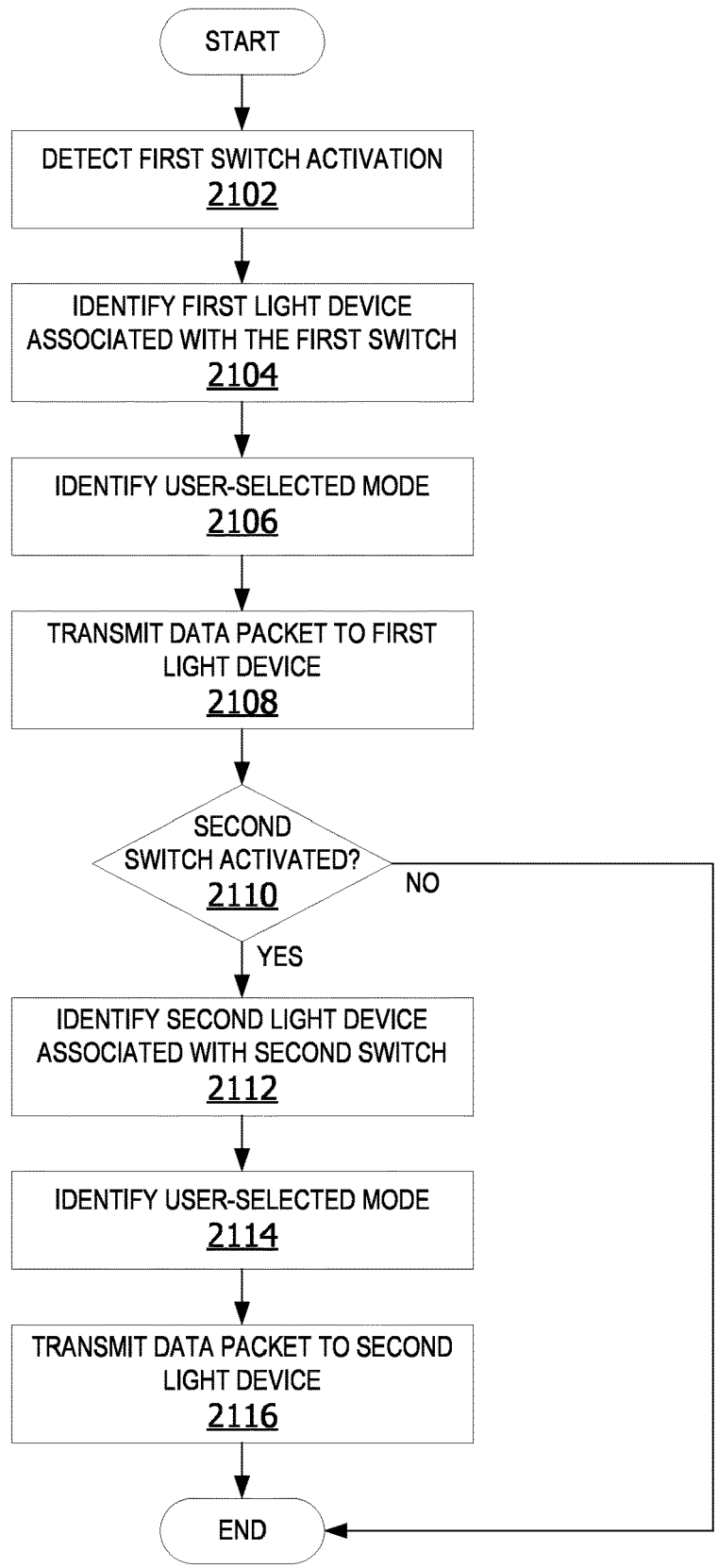
FIG. 21 is an exemplary flow chart illustrating operation of the light controller device to identify light devices mapped to activated switch devices.

FIG. 21 is an exemplary flow chart illustrating operation of the light controller device to identify light devices mapped to activated switch devices. The process shown in FIG. 21 is performed by a light control manager executing on a controller device, such as the light controller device 100 in FIG. 1.

The process begins by detecting a first switch activation at 2102. A first light device associated with the first switch is identified at 2104. A user-selected mode is identified at 2106. The user-selected mode can be identified based on the mode or function associated with the first switch. A data packet is transmitted to the first light device using a first serial data wire at 2108. A determination is made whether a second switch is activated at 2110. If yes, a second light device associated with a second switch is identified at 2112. A user-selected mode is identified at 2114. A data packet is transmitted to the second light device using a second serial data wire at 2116. The process terminates thereafter.

In the example of FIG. 21, the system includes two switch devices and two light devices. However, the examples are not limited to two switch devices or two light devices. The system can include any number of switch devices and/or any number of light devices. In some examples, the multicolor data control system includes three or more switch devices. Likewise, the multicolor data control system in still other examples include three or more light devices.

Figure 22:
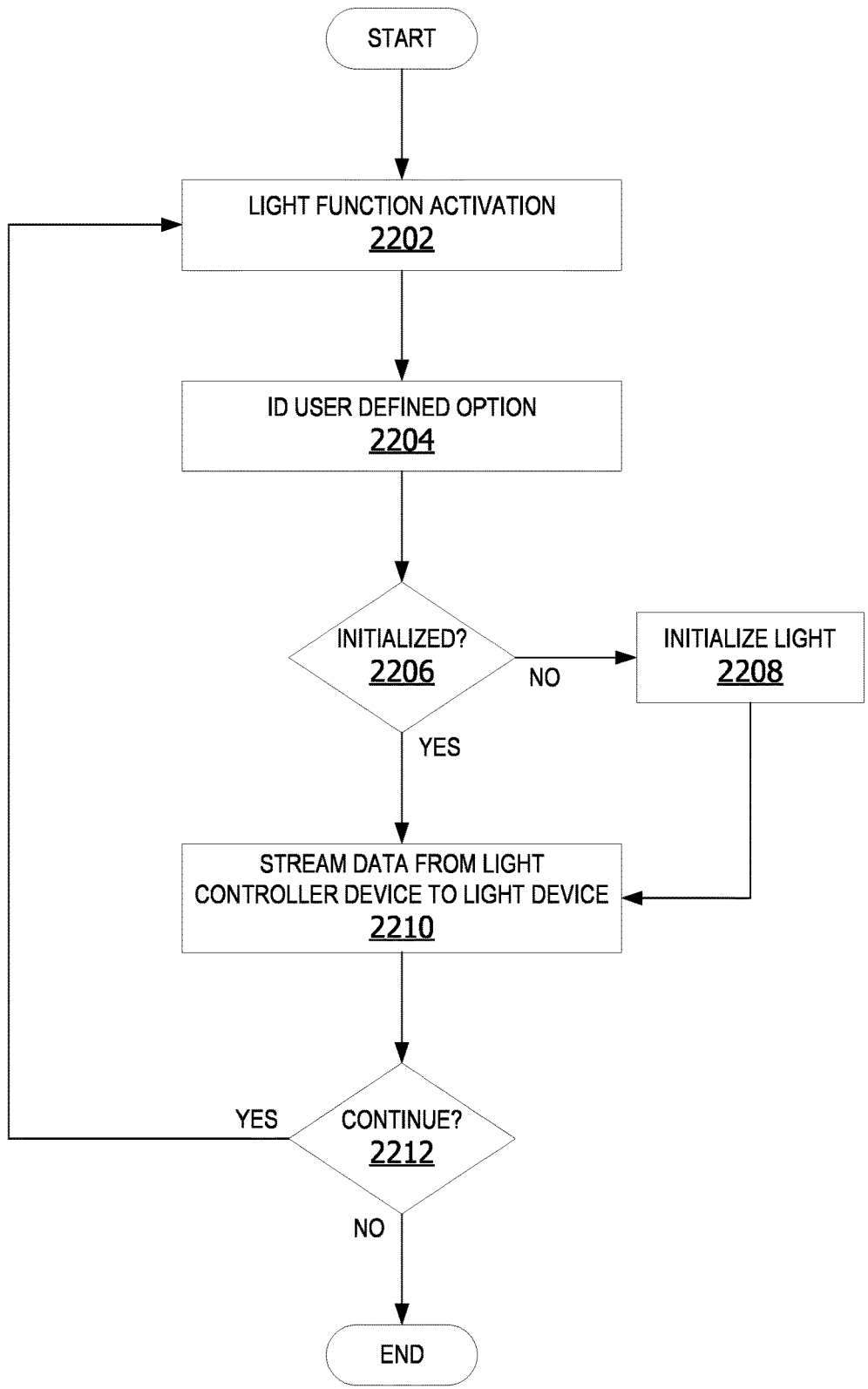
FIG. 22 is an exemplary flow chart illustrating operation of the light controller device to activate a light function via a light controller device.

FIG. 22 is an exemplary flow chart illustrating operation of the light controller device to activate a light function via a light controller device. The process shown in FIG. 22 is performed by a light control manager executing on a controller device, such as the light controller device 100 in FIG. 1 and/or by a light device, such as the light device 106 in FIG. 1.

The process begins by detecting a light function activation at 2202. Light function activation can occur via a physical switch being engaged, input entered into a user interface, or a vehicle function. In some examples, the user utilizes a touch screen associated with a user device to select a zone from a plurality of zones represented on a menu, such as, but not limited to, a graphical user interface (GUI) menu. A user defined option is identified at 2204. The user defined option is a mode or function selected by a user for a light devices. A determination is made whether the selected light device is initialized at 2206. If no, the light device is initialized at 2208. The light, in some examples, is initialized using a magnet to activate a Hall effect sensor in the light device. Data is streamed from the light controller device and/or from the light device at 2210 using serial data communication. A determination is made whether to continue at 2212. If yes, operations 2202 through 2410 are iteratively executed until a determination is made not to continue at 2212. The process terminates thereafter.

Figure 23:
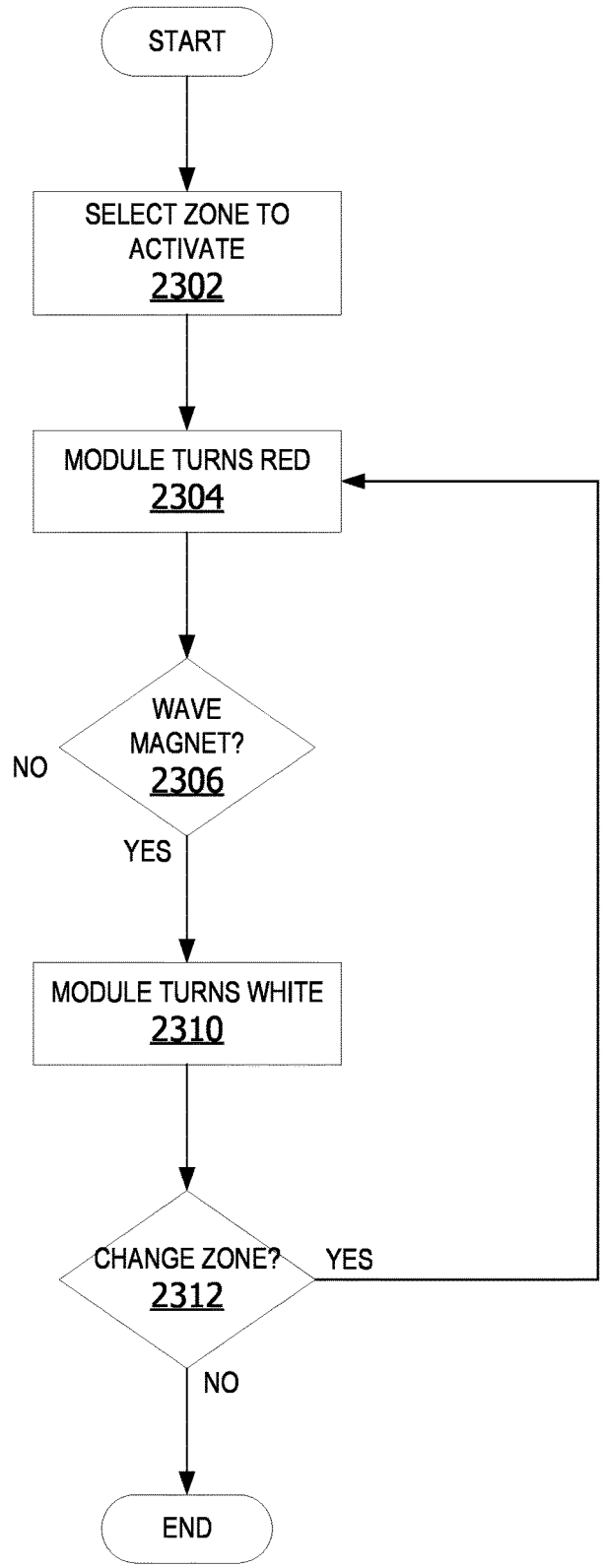
FIG. 23 is an exemplary flow chart illustrating operation of the light controller device to initialize a light device using a magnet.

FIG. 23 is an exemplary flow chart illustrating operation of the light controller device to initialize a light device using a magnet. The process shown in FIG. 23 is performed by a light control manager executing on a controller device, such as the light controller device 100 in FIG. 1 and/or by a light device, such as the light device 106 in FIG. 1.

The process begins with selection of a zone to activate at 2302. The module (light device(s)) in the selected zone turns red at 2304. The red light indicates the module is in an initialization mode. If a magnet is waved on or near the module (magnet detected by the sensor) at 2306, the module light turns white at 2310. The magnet is detected by the sensor in the light device. The light head of the light device containing the sensor is the part of the system that detects or senses the magnet. If the magnet is not waved on or near the module (undetected magnet), the module remains red. A determination is made whether to change the zone to initialize (initialization state) at 2312. If yes, the module turns red at 2304. If no, the module remains white indicating the zone/light device(s) are initialized or the module has been mapped to one or more selected switch devices. The process terminates thereafter.

Additional Examples

Alternatively, or in addition to the other examples described herein, examples include any combination of the following:

a set of wires connecting the light controller device to the plurality of multicolor light devices, the set of wires comprising a power wire providing power to the plurality of multicolor light devices; a ground wire connected to a chassis of the vehicle; and a serial data wire transmitting the data packet to the at least one light device associated with serial data communication channel;

a first initialization sensor associated with a first light device;

a second initialization sensor associated with a second light device, wherein a magnet is waved near the first initialization sensor during an initialization procedure mapping the first light device to a first switch in the plurality of switch devices, and wherein the magnet is waved near the second initialization sensor during the initialization procedure to map the second light device to a second switch in the plurality of switch devices;

activate a light device;

receive sensor data from an initialization sensor associated with the light device;

map the light device to a selected switch;

wherein the initialization sensor is a Hall effect sensor;

a diagnostic sensor associated with the at least one light device, wherein the at least one light device transmits diagnostic data to the light control device via the serial data communication channel;

obtain switch data from a first switch in a plurality of switch devices on a vehicle, the first switch corresponding to a first set of light devices associated with a first zone;

transmit a first data packet, including first light mode activation instructions identifying a first combination of colors and a first flash pattern to the first set of light devices via a serial data communication channel;

receive switch data from a second switch in the plurality of switch devices on the vehicle, the second switch corresponding to a second set of light devices associated with a second zone;

transmit a second data packet, including second light mode activation instructions identifying a second combination of colors and a second flash pattern to the second set of light devices via the serial data communication channel;

activate the first set of light devices to flash the first combination of light colors in the first flash pattern in accordance with the first light mode activation instructions and the second set of light devices to flash the second combination of light colors in the second flash pattern in accordance with the second light mode activation instructions;

receiving mode selection data from at least one switch in a plurality of switch devices on a vehicle, the at least one switch corresponding to a first set of light devices associated with a first zone in a plurality of multicolor light devices on a vehicle;

identifying a user-selected mode from a plurality of function modes associated with the first set of light devices based on the mode selection data;

generating a data packet, including light mode activation instructions for activating a combination of light colors and a flash pattern corresponding to the user-selected mode of the first set of light devices;

transmitting the data packet, including the light mode activation instructions to the plurality of multicolor light devices via a serial data communication channel;

activating the first set of light devices to flash the combination of light colors in the flash pattern in accordance with the light mode activation instructions, wherein a second set of light devices remain inactivated by the light mode activation instructions in the data packet;

transmitting the data packet to the first set of light devices via a set of wires connecting the light controller device to the plurality of multicolor light devices, the set of wires comprising a power wire providing power to the plurality of multicolor light devices, a ground wire connected to a chassis of the vehicle; and at least one data wire transmitting the data packet to the first set of light devices associated with the serial data communication channel;

waving a magnet near a first initialization sensor associated with a first light device during an initialization procedure to map the first light device to a first switch in the plurality of switch devices;

waving the magnet near a second initialization sensor associated with a second light device during an initialization procedure to map the second light device to a second switch in the plurality of switch devices;

activating a light device; receiving sensor data from an initialization sensor associated with the light device in response to a magnet passing within a given proximity of the initialization sensor; and mapping the light device to a selected switch in the plurality of switch devices;

receiving diagnostic data from at least one diagnostic sensor associated with at least one light device in the plurality of multicolor light devices via the serial data communication channel;

obtaining switch data from a first switch in a plurality of switch devices on a vehicle, the first switch corresponding to a first set of light devices associated with a first zone;

transmitting a first data packet, including first light mode activation instructions identifying a first combination of colors and a first flash pattern to the first set of light devices via a serial data communication channel;

receiving switch data from a second switch in the plurality of switch devices on the vehicle, the second switch corresponding to a second set of light devices associated with a second zone;

transmitting a second data packet, including second light mode activation instructions identifying a second combination of colors and a second flash pattern to the second set of light devices via the serial data communication channel;

activating the first set of light devices to flash the first combination of light colors in the first flash pattern in accordance with the first light mode activation instructions and the second set of light devices to flash the second combination of light colors in the second flash pattern in accordance with the second light mode activation instructions;

obtain switch data from a first switch in a plurality of switch devices on a vehicle, the first switch corresponding to a first set of light devices associated with a first zone;

transmit a first data packet, including first light mode activation instructions identifying a first combination of colors and a first flash pattern to the first set of light devices via a serial data communication channel;

receive switch data from a second switch in the plurality of switch devices on the vehicle, the second switch corresponding to a second set of light devices associated with a second zone;

transmit a second data packet, including second light mode activation instructions identifying a second combination of colors and a second flash pattern to the second set of light devices via the serial data communication channel; and activate the first set of light devices to flash the first combination of light colors in the first flash pattern in accordance with the first light mode activation instructions and the second set of light devices to flash the second combination of light colors in the second flash pattern in accordance with the second light mode activation instructions;

at least one data wire transmitting the first data packet to the first set of light devices and the second data packet to the second set of light devices;

a first initialization sensor associated with a first light device; and a second initialization sensor associated with a second light device, wherein a magnet is waved near the first initialization sensor during an initialization procedure mapping the first light device to a first switch in the plurality of switch devices, and wherein the magnet is waved near the second initialization sensor during the initialization procedure to map the second light device to a second switch in the plurality of switch devices; and a diagnostic sensor associated with the at least one light device, wherein the at least one light device transmits diagnostic data to the light control device via the serial data communication channel.

At least a portion of the functionality of the various elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17 and FIG. 18 can be performed by other elements in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17 and FIG. 18, or an entity (e.g., processor, web service, server, application program, computing device, etc.) not shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17 and FIG. 18.

In some examples, the operations illustrated in FIG. 19, FIG. 20, FIG. 21, FIG. 22, and FIG. 23 can be implemented as software instructions encoded on a computer-readable medium, in hardware programmed or designed to perform the operations, or both. For example, aspects of the disclosure can be implemented as a system on a chip or other circuitry including a plurality of interconnected, electrically conductive elements.

In other examples, a computer readable medium having instructions recorded thereon which when executed by a light controller or a computer device cause the controller device or computer device to cooperate in performing a method of multicolor data control using serial data communication channel, the method comprising receiving mode selection data from at least one switch in a plurality of switch devices on a vehicle; identifying a user-selected mode from a plurality of function modes associated with the first set of light devices based on the mode selection data; generating a data packet, including light mode activation instructions for activating a combination of light colors and a flash pattern corresponding to the user-selected mode of the first set of light devices; transmitting the data packet, including the light mode activation instructions to the plurality of multicolor light devices via a serial data communication channel; and activating the first set of light devices to flash the combination of light colors in the flash pattern in accordance with the light mode activation instructions, wherein a second set of light devices remain inactivated by the light mode activation instructions in the data packet.

While the aspects of the disclosure have been described in terms of various examples with their associated operations, a person skilled in the art would appreciate that a combination of operations from any number of different examples is also within scope of the aspects of the disclosure.

The term "Wi-Fi" as used herein refers, in some examples, to a wireless local area network using high frequency radio signals for the transmission of data. The term "BLUETOOTH®" as used herein refers, in some examples, to a wireless technology standard for exchanging data over short distances using short wavelength radio transmission. The term "NFC" as used herein refers, in some examples, to a short-range high frequency wireless communication technology for the exchange of data over short distances.

Exemplary Operating Environment

Exemplary computer-readable media include flash memory drives, digital versatile discs (DVDs), compact discs (CDs), floppy disks, and tape cassettes. By way of example and not limitation, computer-readable media comprise computer storage media and communication media. Computer storage media include volatile and nonvolatile, removable, and non-removable media implemented in any method or technology for storage of information such as computer-readable instructions, data structures, program modules and the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, and other solid-state memory. In contrast, communication media typically embody computer-readable instructions, data structures, program modules, or the like, in a modulated data signal such as a carrier wave or other transport mechanism and include any information delivery media.

Examples of the disclosure can be described in the general context of computer-executable instructions, such as program modules, executed by one or more computers or other devices associated with a vehicle in software, firmware, hardware, or a combination thereof. The computer-executable instructions can be organized into one or more computer-executable components or modules. Generally, program modules include, but are not limited to, routines, programs, objects, components, and data structures that perform tasks or implement abstract data types. Aspects of the disclosure can be implemented with any number and organization of such components or modules. For example, aspects of the disclosure are not limited to the specific computer-executable instructions, or the specific components or modules illustrated in the figures and described herein. Other examples of the disclosure can include different computer-executable instructions or components having more functionality or less functionality than illustrated and described herein.

The examples illustrated and described herein as well as examples not specifically described herein but within the scope of aspects of the disclosure constitute exemplary means for multicolor data control of light devices on an emergency vehicle. For example, the elements illustrated in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18, such as when encoded to perform the operations illustrated in FIG. 19, FIG. 20, FIG. 21, FIG. 22 and FIG. 2, constitute exemplary means for identifying a user-selected mode associated with at least one light device in the plurality of multicolor light devices from the plurality of function modes based on mode selection data received from at least one switch in the plurality of switch devices; exemplary means for transmitting a data packet, including light mode activation instructions corresponding to the user-selected mode, to the at least one light device via a serial data communication channel; and exemplary means for activating the at least one light device to flash the combination of light colors in the flash pattern associated with the user-selected mode via the light mode activation instructions.

Other non-limiting examples provide one or more computer storage devices having a first computer-executable instructions stored thereon for providing multicolor data control of light devices on an emergency vehicle. When executed by a computer, the computer performs operations including obtaining switch data from a first switch in a plurality of switch devices on a vehicle, the first switch corresponding to a first set of light devices associated with a first zone; transmitting a first data packet, including first light mode activation instructions identifying a first combination of colors and a first flash pattern to the first set of light devices via a serial data communication channel; receiving switch data from a second switch in the plurality of switch devices on the vehicle, the second switch corresponding to a second set of light devices associated with a second zone; sending a second data packet, including second light mode activation instructions identifying a second combination of colors and a second flash pattern to the second set of light devices via the serial data communication channel; and activating the first set of light devices to flash the first combination of light colors in the first flash pattern in accordance with the first light mode activation instructions and the second set of light devices to flash the second combination of light colors in the second flash pattern in accordance with the second light mode activation instructions.

The order of execution or performance of the operations in examples of the disclosure illustrated and described herein is not essential, unless otherwise specified. That is, the operations can be performed in any order, unless otherwise specified, and examples of the disclosure can include additional or fewer operations than those disclosed herein. For example, it is contemplated that executing or performing an operation before, contemporaneously with, or after another operation is within the scope of aspects of the disclosure.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e., "one or the other but not both") when preceded by terms of exclusivity, such as "either", "one of", "only one of", or "exactly one of" "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A vehicle light control system for managing multimodal light devices using serial data communication, the system comprising:
    a plurality of multicolor light devices removably attached to at least a portion of a surface of a vehicle, a light device in the plurality of multicolor light devices comprising a plurality of function modes;
    a light controller device communicatively coupled to the plurality of multicolor light devices and a plurality of switch devices, the light controller device further comprising at least one memory communicatively coupled to at least one processor, the at least one memory comprising computer-readable instructions configured to, with the at least one processor, implement a mode control manager, to cause the at least one processor to:
    receive first switch data identifying a user-selected mode in a plurality of function modes from a first switch in a plurality of switch devices on a vehicle, the first switch corresponding to a first set of light devices associated with a first zone, the user-selected mode identifying a first combination of light colors and a first flash pattern of the first set of light devices;
    transmit a first data packet, including first light mode activation instructions corresponding to the user-selected mode, to the first set of light devices via a serial data communication channel, the first data packet identifying the first combination of light colors and the first flash pattern;
    receive second switch data from a second switch in the plurality of switch devices on the vehicle, the second switch corresponding to a second set of light devices associated with a second zone;
    transmit a second data packet, including second light mode activation instructions identifying a second combination of light colors and a second flash pattern to the second set of light devices via the serial data communication channel; and
    activate the first set of light devices to flash the first combination of light colors in the first flash pattern in accordance with the first light mode activation instructions and the second set of light devices to flash a second combination of light colors in the second flash pattern in accordance with the second light mode activation instructions.

2. The vehicle light control system of claim 1, further comprising:
    a set of wires connecting the light controller device to the plurality of multicolor light devices, the set of wires comprising:
        a power wire providing power to the plurality of multicolor light devices;
        a ground wire connected to a chassis of the vehicle; and
        a serial data wire transmitting the data packet to the first set of light devices associated with the serial data communication channel.

3. The vehicle light control system of claim 1, further comprising:
    a first initialization sensor associated with a first light device; and
    a second initialization sensor associated with a second light device, wherein a magnet is waved near the first initialization sensor during an initialization procedure mapping the first light device to the first switch in the plurality of switch devices, and wherein the magnet is waved near the second initialization sensor during the initialization procedure to map the second light device to the second switch in the plurality of switch devices.

4. The vehicle light control system of claim 1, wherein the instructions are further operative to:
    activate a light device;
    receive sensor data from an initialization sensor associated with the light device; and
    map the light device to a selected switch.

5. The vehicle light control system of claim 4, wherein the initialization sensor is a Hall effect sensor.

6. The vehicle light control system of claim 1, further comprising:
    a diagnostic sensor associated with at least one light device, wherein the at least one light device transmits diagnostic data to the light control device via the serial data communication channel.

7. The vehicle light control system of claim 1, wherein the instructions are further operative to:
    obtain first switch data from a third switch in the plurality of switch devices on the vehicle, the third switch corresponding to a third set of light devices associated with a third zone;
    transmit a third data packet, including third light mode activation instructions identifying a third combination of light colors and a third flash pattern to the third set of light devices via the serial data communication channel;
    activate the third set of light devices to flash the third combination of light colors in the third flash pattern in accordance with the third light mode activation instructions.

8. A method for managing multimodal light devices via a light control device using serial data communication, the method comprising:
    receiving first switch data, including mode selection data from a first switch in a plurality of switch devices on a vehicle, the first switch corresponding to a first set of light devices associated with a first zone in a plurality of multicolor light devices on a vehicle;

identifying a user-selected mode from a plurality of function modes associated with the first set of light devices based on the mode selection data;

generating a first data packet, including first light mode activation instructions for activating a first combination of light colors and a first flash pattern corresponding to the user-selected mode of the first set of light devices;

transmitting the first data packet, including the first light mode activation instructions to the plurality of multicolor light devices via a serial data communication channel;

receiving second switch data from a second switch in the plurality of switch devices on the vehicle, the second switch corresponding to a second set of light devices associated with a second zone;

transmitting a second data packet, including second light mode activation instructions identifying a second combination of light colors and a second flash pattern to the second set of light devices via the serial data communication channel; and activating the first set of light devices to flash the first combination of light colors in the first flash pattern in accordance with the first light mode activation instructions and the second set of light devices to flash a second combination of light colors in the second flash pattern in accordance with the second light mode activation instructions.

9. The method of claim 8, further comprising:
sending first the data packet to the first set of light devices via a set of wires connecting the light controller device to the plurality of multicolor light devices, the set of wires comprising a power wire providing power to the plurality of multicolor light devices, a ground wire connected to a chassis of the vehicle; and at least one data wire transmitting the first data packet to the first set of light devices associated with the serial data communication channel.

10. The method of claim 8, further comprising:
waving a magnet near a first initialization sensor associated with a first light device during an initialization procedure to map the first light device to the first switch in the plurality of switch devices; and
waving the magnet near a second initialization sensor associated with a second light device during an initialization procedure to map the second light device to the second switch in the plurality of switch devices.

11. The method of claim 8, further comprising:
activating a light device;
receiving sensor data from an initialization sensor associated with the light device in response to a magnet passing within a given proximity of the initialization sensor; and
mapping the light device to a selected switch in the plurality of switch devices.

12. The method of claim 11, wherein the initialization sensor is a Hall effect sensor.

13. The method of claim 8, further comprising:
receiving diagnostic data from at least one diagnostic sensor associated with at least one light device in the plurality of multicolor light devices via the serial data communication channel.

14. The method of claim 8, further comprising:
obtaining third switch data from a third switch in a plurality of switch devices on the vehicle, the third switch corresponding to a third set of light devices associated with a third zone;

transmitting a third data packet, including third light mode activation instructions identifying a third combination of light colors and a third flash pattern to the third set of light devices via a serial data communication channel;

activating the third set of light devices to flash a third combination of light colors in the third flash pattern in accordance with the third light mode activation instructions.

15. A light control device on a vehicle for managing multimodal light devices using serial data communication, the light control device comprising:
a processor;
at least one memory communicatively coupled to at least one processor, the at least one memory comprising computer-readable instructions configured to, with the at least one processor, implement a mode control manager, to cause the at least one processor to:
obtain switch data from a first switch in a plurality of switch devices on a vehicle, the first switch corresponding to a first set of light devices associated with a first zone;
transmit a first data packet, including first light mode activation instructions identifying a first combination of light colors and a first flash pattern to the first set of light devices via a serial data communication channel;
receive switch data from a second switch in the plurality of switch devices on the vehicle, the second switch corresponding to a second set of light devices associated with a second zone;
transmit a second data packet, including second light mode activation instructions identifying a second combination of light colors and a second flash pattern to the second set of light devices via the serial data communication channel; and
activate the first set of light devices to flash the first combination of light colors in the first flash pattern in accordance with the first light mode activation instructions and the second set of light devices to flash the second combination of light colors in the second flash pattern in accordance with the second light mode activation instructions.

16. The light control device of claim 15, further comprising:
a set of wires connecting the light controller device to a plurality of multicolor light devices, the set of wires comprising:
a power wire providing power to the plurality of multicolor light devices;
a ground wire connected to a chassis of the vehicle; and
at least one data wire transmitting the first data packet to the first set of light devices and the second data packet to the second set of light devices.

17. The light control device of claim 15, further comprising:
a first initialization sensor associated with a first light device; and
a second initialization sensor associated with a second light device, wherein a magnet is waved near the first initialization sensor during an initialization procedure mapping the first light device to the first switch in the plurality of switch devices, and wherein the magnet is waved near the second initialization sensor during the initialization procedure to map the second light device to the second switch in the plurality of switch devices.

18. The light control device of claim 15, further comprising:
- activate a light device, wherein the light device turns on a red light to indicate it is in an initialization state;
- receiving sensor data from an initialization sensor associated with the light device in response to waving a magnet near the initialization sensor; and
- mapping the light device to a selected switch in the plurality of switch devices.

19. The light control device of claim 18, wherein the initialization sensor is a Hall effect sensor.

20. The light control device of claim 15, further comprising:
- a diagnostic sensor associated with at least one light device, wherein the at least one light device transmits diagnostic data to the light control device via the serial data communication channel.

\* \* \* \* \*